United States Patent
Chambliss

(10) Patent No.: US 11,617,361 B1
(45) Date of Patent: Apr. 4, 2023

(54) WEIGHTED LURES AND METHODS FOR MAKING WEIGHTED LURES

(71) Applicant: Dragonfly Lures, Inc., Jefferson, GA (US)

(72) Inventor: Jared Anthony Chambliss, Auburn, GA (US)

(73) Assignee: Dragonfly Lures, Inc., Jefferson, GA (US)

( * ) Notice: Subject to any disclaimer, the term of this patent is extended or adjusted under 35 U.S.C. 154(b) by 0 days.

(21) Appl. No.: 17/164,211

(22) Filed: Feb. 1, 2021

Related U.S. Application Data

(63) Continuation-in-part of application No. 15/910,259, filed on Mar. 2, 2018, now abandoned.

(60) Provisional application No. 62/465,976, filed on Mar. 2, 2017.

(51) Int. Cl.
| | |
|---|---|
| *A01K 95/00* | (2006.01) |
| *A01K 85/00* | (2006.01) |
| *B29C 45/14* | (2006.01) |
| *B29K 705/00* | (2006.01) |
| *B29L 31/00* | (2006.01) |

(52) U.S. Cl.
CPC ............ *A01K 95/005* (2013.01); *A01K 85/00* (2013.01); *B29C 45/14819* (2013.01); *B29K 2705/00* (2013.01); *B29L 2031/7002* (2013.01)

(58) Field of Classification Search
CPC ..... A01K 95/005; A01K 85/005; A01K 85/16
See application file for complete search history.

(56) References Cited

U.S. PATENT DOCUMENTS

| | | | |
|---|---|---|---|
| 2,333,484 A | 11/1943 | Miles | |
| 2,659,176 A | 11/1953 | Wenger | |
| 2,979,778 A * | 4/1961 | Fitzsimons | ............... B44F 9/00 |
| | | | 264/DIG. 60 |
| 3,203,132 A * | 8/1965 | Kotis | ..................... A01K 85/16 |
| | | | 43/42.47 |
| 3,392,475 A * | 7/1968 | Vakousky, Jr. | ........ A01K 75/04 |
| | | | 43/44.9 |
| 3,959,060 A | 5/1976 | Jones | |
| 4,335,495 A | 6/1982 | Buchanan | |
| 4,530,179 A | 7/1985 | Larew | |
| 4,653,212 A | 3/1987 | Pixton | |

(Continued)

FOREIGN PATENT DOCUMENTS

| | | |
|---|---|---|
| FR | 58576 E | 1/1954 |
| WO | WO 01/52644 | 7/2001 |

(Continued)

OTHER PUBLICATIONS

"Bite Booster™ Model Trolling Plus S," Bite Booster Lures, Inc., retrieved at https://bitebooster.com on Nov. 20, 2016.

(Continued)

*Primary Examiner* — Peter M Poon
*Assistant Examiner* — Morgan T Jordan
(74) *Attorney, Agent, or Firm* — Hartman & Citrin LLC

(57) ABSTRACT

A weighted lure can include a body formed from plastisol and a weighted portion formed from a high density plastisol. The high density plastisol can include plastisol and a weighting substance dispersed within the plastisol. The weighted portion can be encased by the body. The weighted lure also can include an air pocket or air chamber formed in the body.

20 Claims, 18 Drawing Sheets

(56) References Cited

U.S. PATENT DOCUMENTS

| | | | |
|---|---|---|---|
| D301,730 S | 6/1989 | Morris | |
| 4,858,367 A | 8/1989 | Rabideau | |
| 5,097,621 A | 3/1992 | Hnizdor | |
| 5,786,416 A | 7/1998 | Gardner | |
| 5,915,945 A | 6/1999 | Malone | |
| 5,953,848 A | 9/1999 | Darnell et al. | |
| 6,048,379 A * | 4/2000 | Bray | C08K 7/02 75/229 |
| D428,104 S | 7/2000 | Woods | |
| 6,145,239 A | 11/2000 | Hirahara | |
| 6,182,391 B1 * | 2/2001 | Hubbard | A01K 85/00 43/42.34 |
| 6,325,136 B1 | 12/2001 | Ratte | |
| 6,393,758 B1 | 5/2002 | Sparkman | |
| D460,801 S | 7/2002 | Jones | |
| 6,497,069 B1 | 12/2002 | Acworth | |
| 6,581,320 B1 | 6/2003 | Hnizdor | |
| 6,775,944 B1 | 8/2004 | Jones, Jr. | |
| 6,843,016 B1 | 1/2005 | Jones, Jr. | |
| 7,497,045 B1 | 3/2009 | Crowe | |
| 7,992,343 B1 | 8/2011 | Jones, Jr. | |
| 7,998,394 B1 | 8/2011 | Jones, Jr. | |
| 8,132,356 B2 | 3/2012 | Gill | |
| D698,887 S | 2/2014 | Jones, Jr. | |
| 8,713,847 B2 | 5/2014 | Polachek | |
| 8,733,013 B1 | 5/2014 | Jones, Jr. | |
| 8,832,991 B1 | 9/2014 | Dunbar | |
| 9,345,236 B1 | 5/2016 | Bordosky | |
| 2001/0039753 A1 | 11/2001 | Bomann | |
| 2002/0092640 A1 * | 7/2002 | Ratte | B22D 21/027 164/113 |
| 2002/0188057 A1 * | 12/2002 | Chen | C08L 53/00 43/42 |
| 2003/0159328 A1 | 8/2003 | Acker | |
| 2004/0049969 A1 | 3/2004 | Rudolph | |
| 2005/0039374 A1 | 2/2005 | Reed | |
| 2005/0120613 A1 | 6/2005 | Pack | |
| 2006/0055077 A1 * | 3/2006 | Heikkila | C08K 3/08 264/211 |
| 2006/0070291 A1 | 4/2006 | Pomeroy | |
| 2006/0156612 A1 | 7/2006 | Brzozowski | |
| 2006/0236588 A1 | 10/2006 | Rapelje | |
| 2007/0101638 A1 | 5/2007 | Dragna, Jr. | |
| 2007/0144054 A1 * | 6/2007 | Warczok | A01K 85/01 43/42.24 |
| 2007/0193106 A1 | 8/2007 | Gregory | |
| 2007/0199233 A1 | 8/2007 | Higgin | |
| 2008/0202017 A1 | 8/2008 | Gregory | |
| 2008/0263933 A1 | 10/2008 | Gibson | |
| 2009/0254171 A1 | 10/2009 | Heikkila | |
| 2009/0307960 A1 | 12/2009 | Oelerich, Jr | |
| 2010/0011651 A1 | 1/2010 | Rapelje | |
| 2010/0115821 A1 * | 5/2010 | Carlson | A01K 85/16 43/4.5 |
| 2010/0162612 A1 | 7/2010 | Kalnas | |
| 2010/0175305 A1 | 7/2010 | Heikkila et al. | |
| 2012/0000113 A1 | 1/2012 | Davis | |
| 2012/0023804 A1 | 2/2012 | Hogan | |
| 2012/0079757 A1 | 4/2012 | Rye | |
| 2012/0096757 A1 | 4/2012 | Langer | |
| 2013/0036655 A1 | 2/2013 | Miller | |
| 2013/0180158 A1 | 7/2013 | Butters | |
| 2013/0185989 A1 | 7/2013 | Langer | |
| 2013/0318859 A1 | 12/2013 | Kusmerz et al. | |
| 2014/0059916 A1 | 3/2014 | Culver | |
| 2014/0237889 A1 | 8/2014 | Tamburro | |
| 2015/0089860 A1 | 4/2015 | Temple | |
| 2016/0270379 A1 | 9/2016 | Perez | |

FOREIGN PATENT DOCUMENTS

| | | | |
|---|---|---|---|
| WO | WO-0152644 A1 * | 7/2001 | A01K 85/16 |
| WO | WO 02/03794 | 1/2002 | |
| WO | WO 02/49424 | 6/2002 | |
| WO | WO-0249424 A1 * | 6/2002 | A01K 85/16 |
| WO | WO 2013056349 | 4/2013 | |
| WO | WO 2013167791 | 11/2013 | |
| WO | WO-2013167791 A1 * | 11/2013 | A01K 85/16 |
| WO | WO 2015164908 | 11/2015 | |
| WO | WO-2015164908 A1 * | 11/2015 | A01K 85/00 |

OTHER PUBLICATIONS

Love, Gary, "About Jackfish Lures," World Fishing Network, May 25, 2012, http://www.worldfishingnetwork.com/community/post/about-jackfish-lures.

"Nature Jig," Northland Fishing Tackle, retrieved at https://shop.northlandtackle.com/search.php?search_query=bismuth&Search=1/2SearchResultsSearchResults for on Nov. 20, 2016.

"Arkie Bismuth Alloy Rigged Curl Tail Grub," Walmart, retrieved at https://www.walmart.com/ip/Arkie-Bismuth-Alloy-Rigged-Curl-Tail-Grub/158406505 on Nov. 20, 2016.

U.S. Office Action dated May 26, 2020 in U.S. Appl. No. 15/910,259.

U.S. Office Action dated Oct. 2, 2020 in U.S. Appl. No. 15/910,259.

* cited by examiner

WEIGHTED LURES AND METHODS FOR MAKING WEIGHTED LURES

CROSS-REFERENCE TO RELATED APPLICATION

This application is continuation-in-part of and claims priority to U.S. patent application Ser. No. 15/910,259, entitled "Weighted Lures and Methods for Making Weighted Lures," filed Mar. 2, 2018, now abandoned, which is incorporated herein by reference in its entirety; and which is a non-provisional of, and claims priority to, U.S. Provisional Patent Application No. 62/465,976, entitled "Weighted Lures and Methods for Making Weighted Lures," filed Mar. 2, 2017, which is incorporated herein by reference in its entirety.

BACKGROUND

Unless otherwise indicated herein, all disclosures in the background are not prior art to the claims in this application and are not admitted to be prior art by inclusion in this section.

Traditionally, fishing was done with hooks and line. A piece of bait such as a worm, an insect, a piece of food (e.g., corn, sausage, etc.), a minnow, or other bait was placed on the hook and thrown into the water. When the bait is eaten by a fish, the hook pierces the mouth and the fish can be removed (via the hook) from the water for sport, for consumption, or for other reasons.

Over the years, real bait has been replaced with synthetic bait or other lures. The lures can be formed from various materials such as wood, metal, plastic, other materials and/or combinations thereof. Some of these materials may be buoyant and therefore the lure may float to the surface of the water. Some fish may or may not see or be interested in the lure if located at the surface of the water. To address this issue, fisherman often attach weights to the line or to the lure, thereby causing the lure to sink. In many cases, a lead weight is used.

Lead weights can be formed as a ball or other shape with a slit formed therein. The line can be passed through the slit and the weight can be crimped around the line. Given the toxicity of lead, some fisherman may wish to avoid using lead weights. Additionally, the weights may fall off the line during fishing and pollute waters. Also, as the size of the lure changes, the amount of weights needed may change. These and other aspects of using traditional weighting technologies may create annoyances for fishermen.

SUMMARY

It should be appreciated that this summary is provided to introduce a selection of concepts associated with the concepts and technologies disclosed herein in a simplified form. The concepts discussed in this summary are further described below in the detailed description. This summary does not limit the scope of the claimed subject matter and/or the disclosure thereof in the detailed description and drawings in any way.

The present disclosure is directed to weighted lures and methods for making weighted lures. The weighted lure can be formed from a synthetic material such as plastisol or other materials. Metal particles or other materials can be dispersed throughout the lure, resulting in a weighted lure. The weighted lure may not require any additional weighting to function as intended, in some embodiments.

According to one embodiment of the concepts and technologies disclosed herein, a weighted lure is disclosed. The weighted lure can include a body formed from a first material and a weighted portion formed from a second material. The second material can include a bearing material (or substrate) and a weighting substance dispersed within the bearing material. The second material can include between ten percent and sixty percent by volume of the weighting substance.

In some embodiments, the weighted portion can be encased by the first material of the body. In some embodiments, the weighted portion can include a weighted insert. In some embodiments, the weighted insert can include nubs. In some embodiments, the bearing material can include silicone, and the weighting substance can include tungsten. In some embodiments, the weighted lure can further include an air pocket. The air pocket can be formed in the body.

In some embodiments, the first material can include plastisol. In some embodiments, the first material can include an unweighted plastisol. In some embodiments, the second material can include a high density plastisol, and the bearing material can include plastisol. In some embodiments, the weighting substance can include tungsten powder. In some embodiments, the weighting substance can include bismuth. In some embodiments, the body can include a ridged portion. In some embodiments, the ridged portion can be located at or near a first end of the body. In some embodiments, the body can include a smooth portion. In some embodiments, the smooth portion can be located at or near a second end of the body. In some embodiments, the weighted portion can be located within the ridged portion of the body. In some embodiments, an air pocket can be located at the second end of the body. In some embodiments, the first material can include plastisol and dye.

According to another embodiment of the concepts and technologies disclosed herein, another weighted lure is disclosed. The weighted lure can include a body formed from a first plastisol. The weighted lure further can include a weighted portion. The weighted portion can be formed from a high density material. The high density material can include a second plastisol and a weighting substance dispersed within the second plastisol. The high density material can include between ten percent and sixty percent by volume of the weighting substance. The weighted portion can be encased by the body. The weighted lure further can include an air pocket formed in the body.

In some embodiments, the first plastisol can include an unweighted plastisol. In some embodiments, the first plastisol can include a weighted plastisol having a further weighting substance dispersed throughout the first plastisol. In some embodiments, the weighting substance can include tungsten powder. In some embodiments, the weighting substance can include bismuth. In some embodiments, the body can include a ridged portion. In some embodiments, the ridged portion can be located at or near a first end of the body. In some embodiments, the body further can include a smooth portion. In some embodiments, the smooth portion can be located at or near a second end of the body. In some embodiments, the weighted portion can be located within the ridged portion of the body.

According to yet another embodiment of the concepts and technologies disclosed herein, yet another weighted lure is disclosed. The weighted lure can include a body formed from a material including plastisol and a weighting substance dispersed throughout the plastisol.

The features, functions, and advantages discussed herein can be achieved independently in various embodiments of the concepts and technologies disclosed herein, or may be combined in yet other embodiments, further details of which can be seen with reference to the following description and drawings. As noted above, the foregoing summary is illustrative only and is not limiting in any way. In addition to the illustrative aspects, embodiments, and features described above, further aspects, embodiments, and features will become apparent by reference to the drawings and the following detailed description.

DETAILED DESCRIPTION

Figure 1:
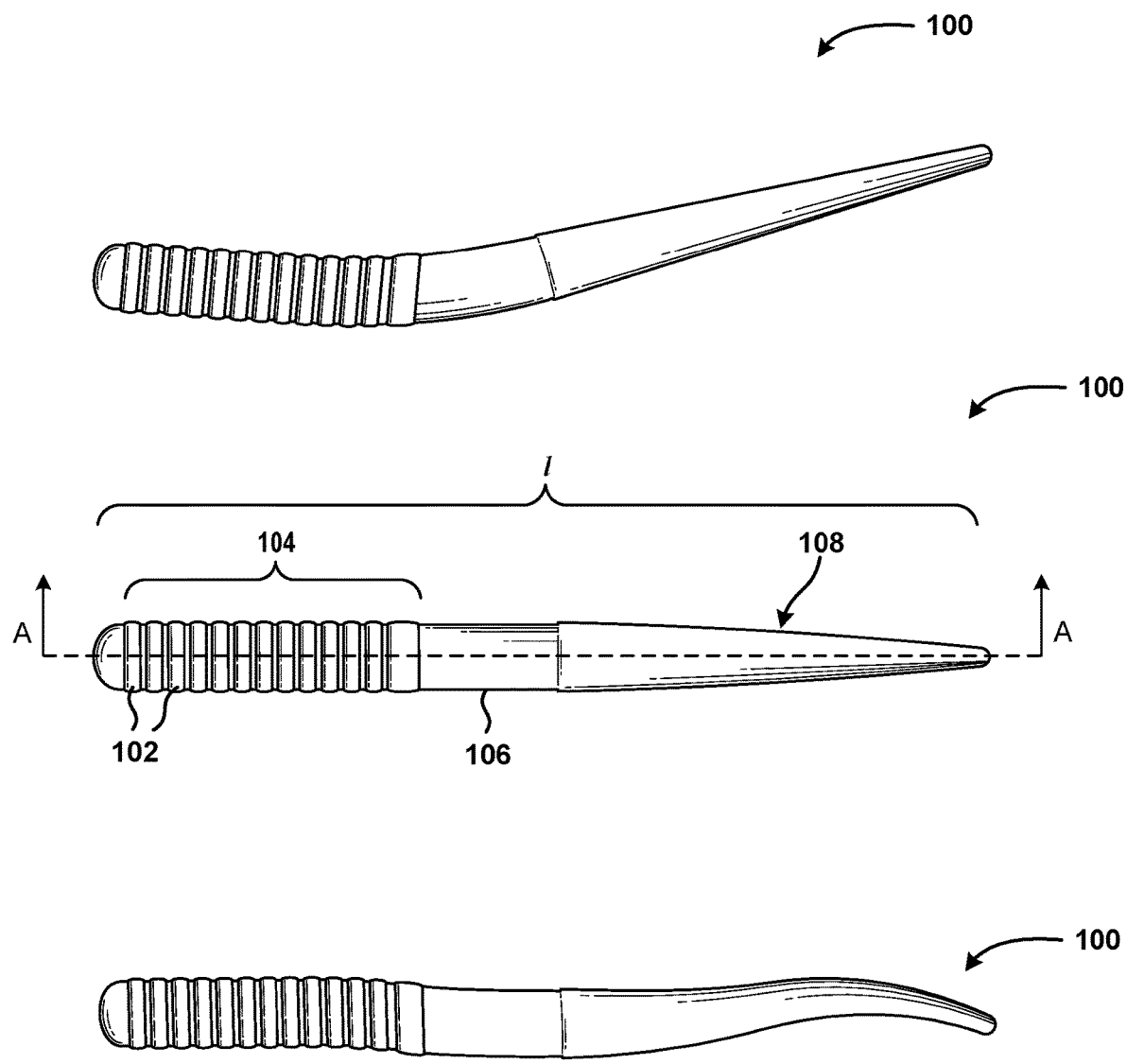
FIG. 1 is a line drawing showing weighted lures, according to some example embodiments of the concepts and technologies disclosed herein.

In the following detailed description, references are made to the accompanying drawings that form a part hereof and that show, by way of illustration, specific embodiments or examples. It must be understood that the disclosed embodiments are merely illustrative of the concepts and technologies disclosed herein. The concepts and technologies disclosed herein may be embodied in various and alternative forms, and/or in various combinations of the embodiments disclosed herein. The word "illustrative," as used in the specification, is used expansively to refer to embodiments that serve as an illustration, specimen, model or pattern.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of weighted lures and methods of making weighted lures will be described.

According to various embodiments, the weighted lure illustrated and described herein can include a body that is formed from a material that includes a bearing material or substrate and a dispersed weighting substance that can be dispersed substantially evenly throughout the bearing material or substrate. According to various embodiments, the bearing material or substrate can include silicone, soft plastic, elastic polymers, or other materials. In a preferred embodiment, the bearing material or substrate can include plastisol. The description herein refers to plastisol extensively for clarity, but in view of the alternatives listed above (and known to those of ordinary skill in the art), it should be understood that the concepts and technologies disclosed herein are not limited to plastisol, and that a particular claim is not limited to plastisol unless "plastisol" is explicitly recited in that claim (or its base claim).

According to various embodiments, the weighting substance can be dispersed throughout the weighted lure or through a portion of the weighted lure. According to some embodiments of the concepts and technologies disclosed herein, a first density material (with weighting substance dispersed therethrough) can be used to form a first portion of the weighted lure, and a second density material (with weighting substance dispersed therethrough) can be used to form a second portion of the weighted lure.

According to various embodiments of the concepts and technologies disclosed herein, the weighting substance can be bismuth. According to various other embodiments of the concepts and technologies disclosed herein, the weighting substance can be tungsten. According to various other embodiments, other weighting substances (lead, copper, steel, etc.) can be used. In some embodiments, a non-lead weighting substance can be preferred for environmental or other reasons. In some other embodiments, the weighting substance can include other materials.

According to various embodiments, the weighting substance (e.g., bismuth) can be purchased in slabs. The slabs of the weighting substance can be broken and/or crushed into granules, dust, or powder. In some embodiments, the weighting substance is bismuth and the bismuth can be crushed using a crusher or other suitable device. An example of a manual crusher that can be used to crush bismuth or other weighting materials will be illustrated and described in FIG. 8. Once a weighting substance of a desired consistency is obtained, the weighting substance can be added to the material used to form the lures.

According to various embodiments, the weighting substance can be added to a vat of warm plastisol and injected into a lure mold. Some examples of the vat are shown below in FIGS. 4-7, and an example of a lure mold will be illustrated and described in more detail below with reference to FIG. 12. In some instances, however, the weighting substance can sink to the bottom of the vat and therefore inconsistently weighted lures may be formed by way of this process. Thus, embodiments of the concepts and technologies disclosed herein include a mixing device that mixes the plastisol/weighting substance mixture to ensure a substantially uniform density in the weighted lure. In some embodiments, the weighted lure can be formed from two or more materials, where the multiple materials have respective multiple densities by preference. Some example embodiments of multiple-material and/or multiple-density weighted lures are illustrated and described in more detail herein.

Turning now to FIG. 1, a weighted lure 100 will be described according to an example embodiment of the concepts and technologies disclosed herein. As shown in FIG. 1, three weighted lures 100 are shown. The general structure of a fishing lure is generally understood and therefore will not be explained in deep detail herein. According to various embodiments of the concepts and technologies disclosed herein, however, it should be noted that the weighted lures 100 can be substantially round all-around, and therefore that various embodiments of the weighed lures 100 can be formed without a flat side or portion. Such embodiments can provide a benefit, in some cases, of the weighted lure 100 having no specific orientation required for use. It should be understood that this example is illustrative, and therefore should not be construed as being limiting in any way.

As generally is understood, the weighted lures 100 can have ridges 102 formed therein along its length l. In some other embodiments, as shown in FIG. 1, the weighted lures 100 can be formed with a ridged portion 104 over which the ridges 102 are formed. The ridges 102 can be provided, in some embodiments, to mimic segments of a worm, though this is not necessarily the case. The weighted lures 100 also can be formed with a smooth portion 106. The smooth portion 106 can be provided to mimic a clitellum of a worm, though this is not necessarily the case. The weighted lures 100 also can include a tail portion 108, which can mimic a tail of a worm, though this is not necessarily the case. Because the concepts and technologies disclosed herein for weighting lures 100 can be used with other shapes of lures (and not only worm-shaped lures), it should be understood that the illustrated embodiments are illustrative and should not be construed as being limiting in any way. The claims are not limited to worm-shaped weighted lures 100 unless such a shape is expressly recited.

Figure 2:
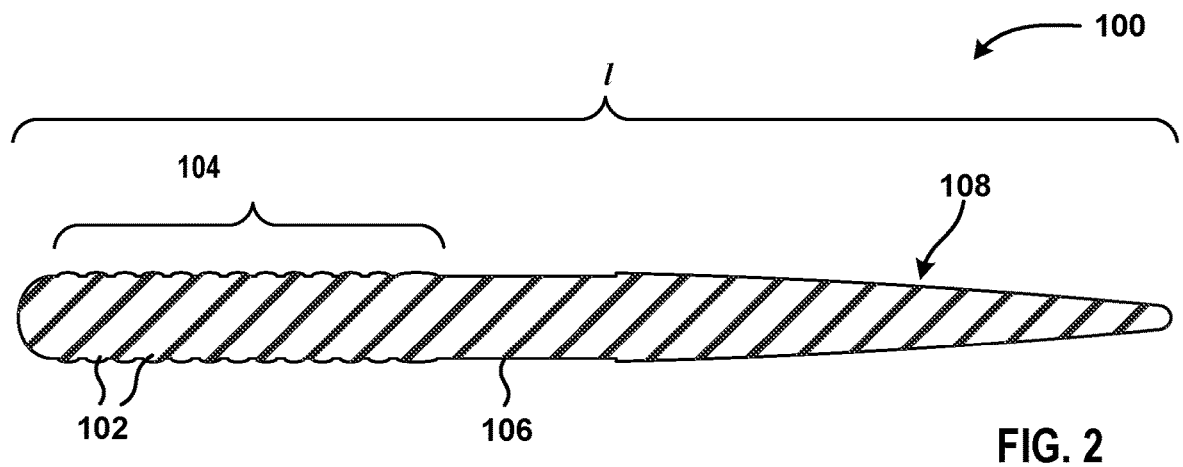
FIG. 2 is a line drawing showing a cross-sectional view of a weighted lure, according to one example embodiment of the concepts and technologies disclosed herein.

Turning now to FIG. 2, additional aspects of the concepts and technologies disclosed herein for weighted lures 100 will be described. In particular, FIG. 2 is a cross-sectional view of one of the weighted lures 100 shown in FIG. 1 as illustrated by the view line A-A shown in FIG. 1. It should be understood that this example is illustrative, and therefore should not be construed as being limiting in any way. As shown in FIG. 2, the weighted lure 100 can be formed from a substantially solid piece of a material. According to various embodiments, the material used to form the weighted lure 100 can include plastisol with a weighting substance dispersed therethrough. Thus, the weighted lure 100 can have a substantially consistent density from point to point within the weighted lure 100. It should be understood that this example is illustrative, and therefore should not be construed as being limiting in any way.

Figure 3:
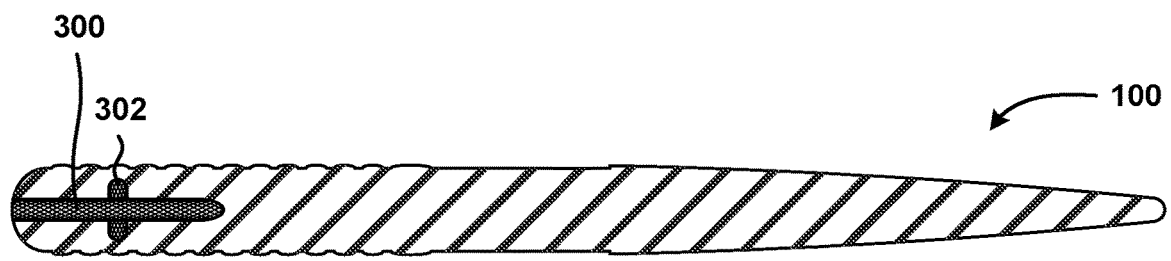
FIG. 3 is a line drawing showing a cross-sectional view of a weighted lure, according to another example embodiment of the concepts and technologies disclosed herein.

Turning now to FIG. 3, additional aspects of the concepts and technologies disclosed herein for weighted lures 100 will be described. In particular, FIG. 3 is a cross-sectional view of one of the weighted lures 100 shown in FIG. 1 as illustrated by the view line A-A shown in FIG. 1, but in an alternative embodiment that uses multiple materials. It should be understood that this example is illustrative, and therefore should not be construed as being limiting in any way. As shown in FIG. 3, the weighted lure 100 can be formed from a substantially solid piece of a first material for most of its body, while a second material can be used to form a weighted insert 300. It should be understood that the shape of the weighted insert 300 shown in FIG. 3 is illustrative and should not be construed as being limiting in any way. In particular, the weighted insert 300 can have any shape, size, dimensions, relative size, and/or relative dimensions (relative to the body of the weighted lure 100). As such, the illustrated embodiment is illustrative and should not be construed as being limiting in any way.

The word "body" as used herein and in the claims can be used to refer to the basic overall shape of the weighted lure 100 and the associated volume of material. Thus, the "body" of the weighted lure 100 can include the entire weighted lure 100 (e.g., in the case of a weighted lure 100 that is formed from weighted material), or a majority of the weighted lure 100 (e.g., the entirety of the weighted lure 100 shown in FIG. 3 other than the weighted insert 300). Thus, in some cases, the weighted lures 100 disclosed herein can include weighting substance throughout the body thereof (e.g., where the entire weighted lure 100 is made from a weighted material), while in some other embodiments the body may be made of unweighted material with a weighted insert 300 of a weighted substance. Thus, a "body" of a weighted lure 100 can correspond to a body of a worm, in some embodiments. In other embodiments, the "body" of the weighted lure 100 can correspond to other entities (e.g., fish, insects, random shapes, combinations thereof, or the like). In some embodiments, the weighted insert 300 can be formed with one or more nubs 302 (two are shown in FIG. 3). The function of the nubs 302 will be explained in more detail below.

According to various embodiments, the material used to form the weighted lure 100 can include plastisol, and the material used to form the weighted insert can include plastisol and a weighting substance dispersed therethrough. Thus, the weighted lure 100 shown in FIG. 3 can be heavier/denser at one portion of the weighted lure 100 (e.g., at the ridged portion 104 of the weighted lure 100) than a second portion of the weighted lure 100 (e.g., at the tail portion 108 of the weighted lure 100 shown in FIG. 3). According to various embodiments, the weighted lure 100 can be formed with a cavity in the ridged portion 104 (or other area of the weighted lure), and a plastisol/weighting substance mixture can be injected into the cavity.

The nubs 302 can be formed in the cavity (in reverse) so that the weighted insert 300 can be held in place by the surrounding plastisol. Thus, in some embodiments the nubs 302 can be provided to hold the weighted insert 300 in the body of the weighted lure 100. For example, if the end of the weighted lure 100 cracks or breaks, the nubs 302 may prevent loss of the weighted insert 300 by providing cantilevers to hold the weighted insert 300 in place. The nubs 302 also can provide more surface area (relative to embodiments without the nubs 302) between the weighted insert 300 and the other portions of the weighted lure 100 (e.g., the cavity, etc.). It should be understood that this example is illustrative, and therefore should not be construed as being limiting in any way.

The weighted lure 100 shown in FIG. 3 can have an inconsistent density from point to point within the weighted lure 100. In some embodiments, this can cause the ridged portion 104 (which can correspond to the head of a real worm) to sink below the tail portion 108 of the weighted lure 100. Such movement in the water can further mimic worms and increase the effectiveness of the weighted lure. Other methods of forming the weighted insert 300 are contemplated and will be illustrated and described below with reference to FIGS. 9-12. As such, it should be understood that the described embodiment is illustrative, and therefore should not be construed as being limiting in any way.

Figure 4:
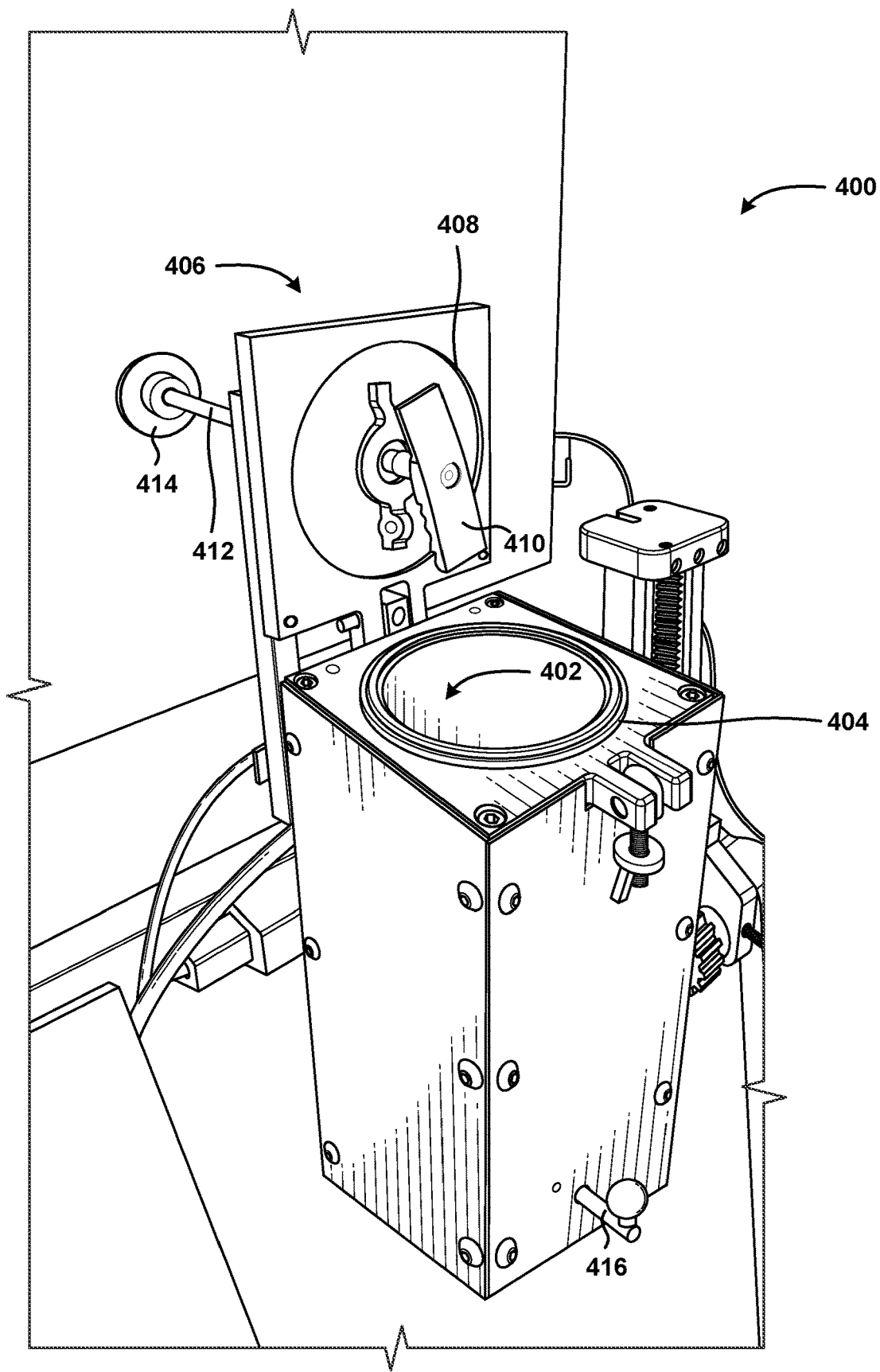
FIGS. 4-5 are line drawings showing perspective views of a mixing device, according to some illustrative embodiments of the concepts and technologies described herein.
Figure 5:
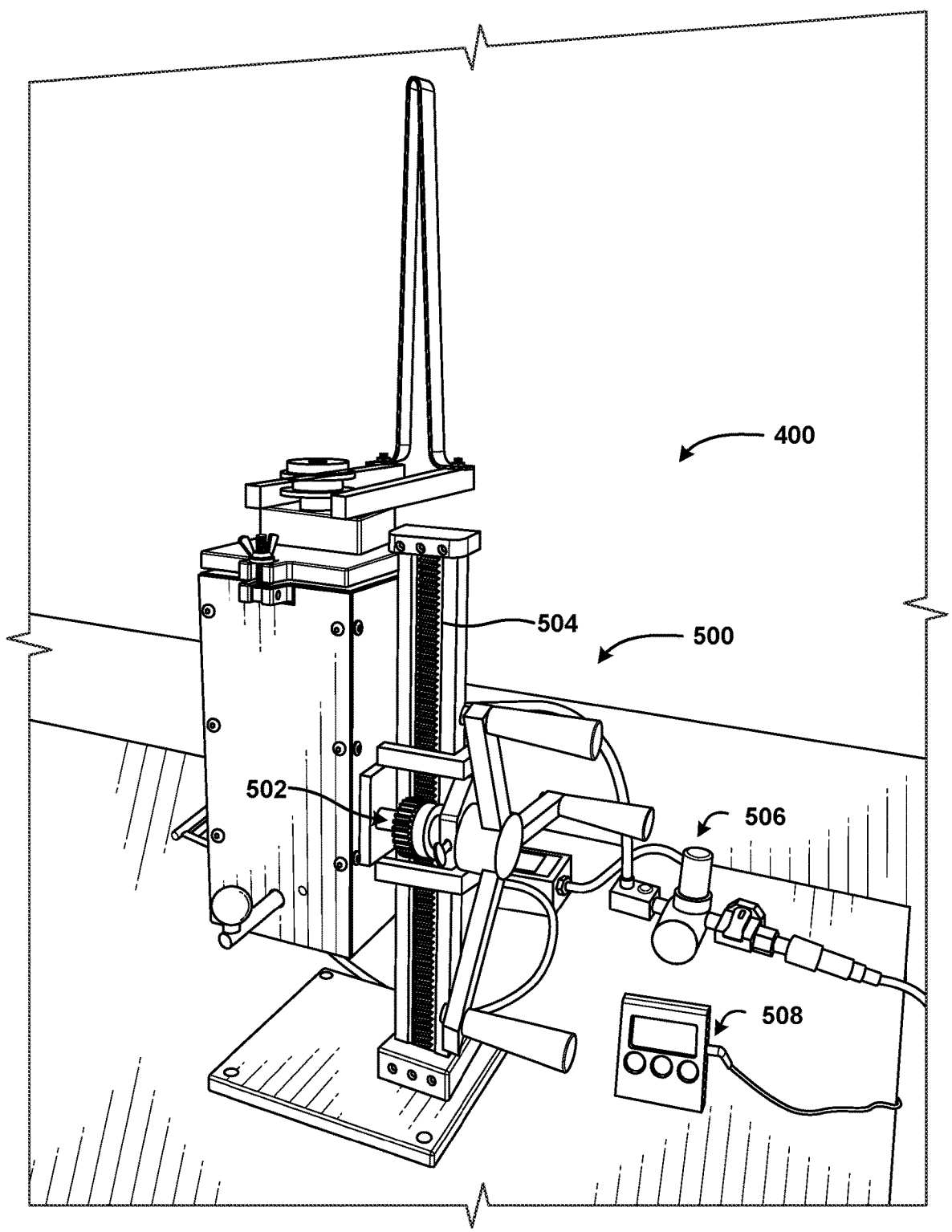

Turning now to FIGS. 4-5, an example of a machine 400 for heating and mixing the plastisol/weighting substance mixture, dosing the mixture into a mold, and mixing the weighting substance into solution with the plastisol will be described. Collective reference to FIGS. 4-5 will be made to explain various components of the machine 400. The machine 400 can include a vat 402. The vat 402 can be filled with a plastisol/weighting substance mixture. The vat 402 can have a seal 404 (e.g., a silicone o-ring or other type of seal) that mates a lid 406, e.g., a mating surface 408 formed in the lid 406 to seal the vat 402. One or more heating element can be located within the machine 400.

The machine 400 also can include a propeller 410 or other mixing structure. The propeller 410 can be configured to spin within the vat 402 (when the lid 406 is rotated on top of the vat 402). In particular, the propeller 410 can be attached to a drive shaft 412, which can be driven by a motor (not shown in FIGS. 4-5). According to various embodiments, the motor can be attached to (or via) a motor attachment mechanism 414 to drive the drive shaft 412. In some embodiments of the concepts and technologies disclosed herein, the drive shaft 412 can be driven by a variable speed drive. In some embodiments, a power drill can be used to drive the drive shaft 412 and/or thereby to mix the mixture and/or to keep the weighting substance dispersed in solution. Because other drives or motors are possible and are contemplated, it should be understood that these examples are illustrative, and therefore should not be construed as being limiting in any way.

The machine 400 can include a tap 416. The tap 416 can be used to fill a mold (not shown in FIGS. 4-5). In particular, the plastisol/weighted substance mixture can be dosed using the tap 416 when heated to a target temperature to fill a mold. During dosing, the propeller 410 can continue mixing the plastisol/weighted substance mixture. It should be understood that this example is illustrative, and therefore should not be construed as being limiting in any way.

The machine 400 also can include a height adjustment mechanism 500. In the illustrated embodiment, the height adjustment mechanism 500 is provided by a rack and pinion mechanism, e.g., a pinion 502 that engages a rack 504. The pinion 502 can be turned manually and/or may be driven by a motor if desired (not illustrated in FIGS. 4-5) to adjust the height of the tap 416. It should be understood that this example is illustrative, and therefore should not be construed as being limiting in any way.

The machine 400 also can include an energy supply 506. The energy supply 506 can be used to supply energy to drive the heating elements (e.g., a gas line for burners, an electric line for heating elements, etc.). The machine 400 also can include various sensors (not visible in FIGS. 4-5). The various sensors can include, for example, a pressure sensor, a volume senor, a fill level sensor, a temperature sensor, etc. Output from one or more of the sensors can be output to a display 508. It should be understood that this example is illustrative, and therefore should not be construed as being limiting in any way.

Figure 6:
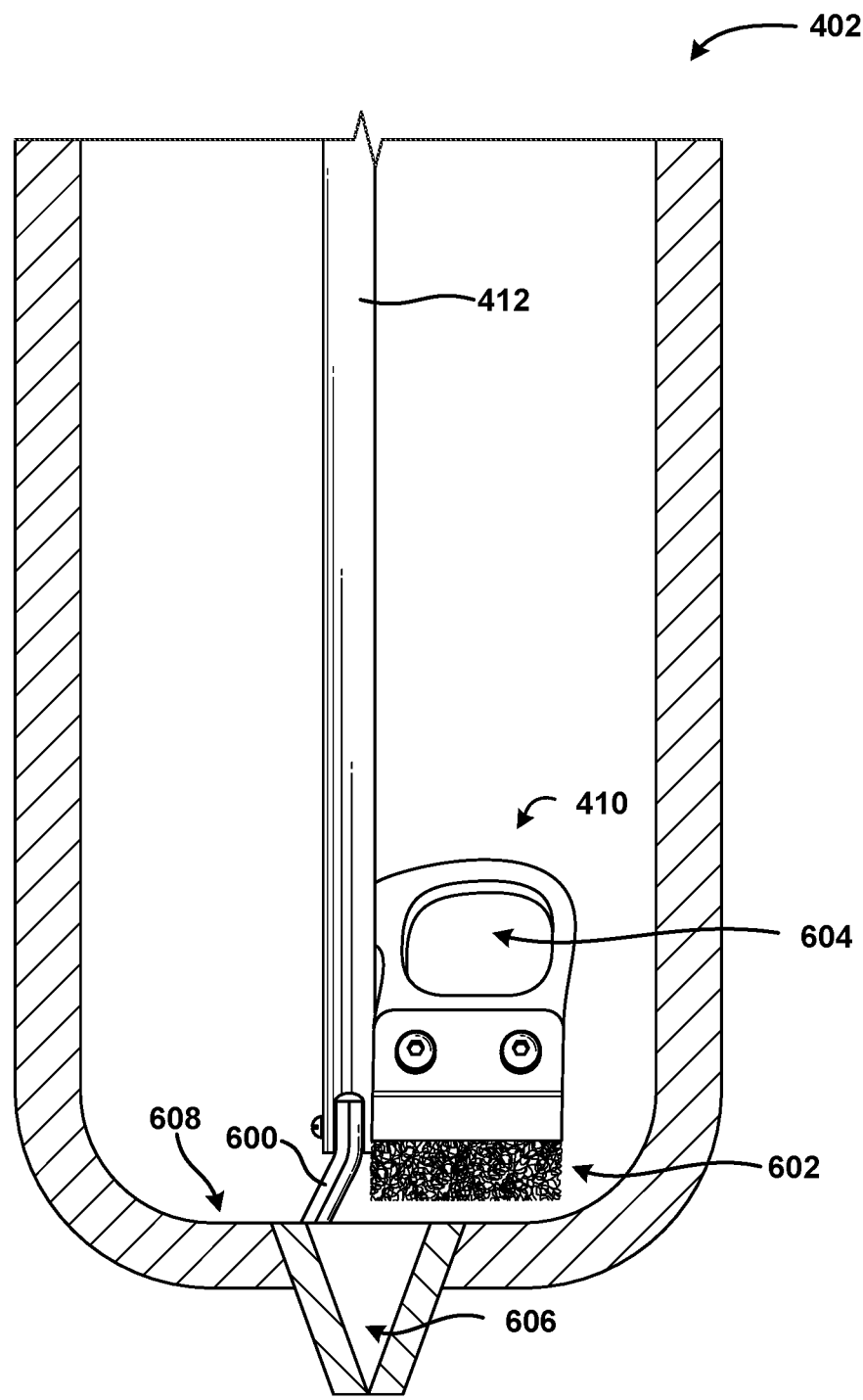
FIGS. 6-7 are line drawings showing additional details about the mixing device, according to some illustrative embodiments of the concepts and technologies described herein.

With additional reference to FIG. 6, a cross-sectional view of the vat 402 is shown, according to an illustrative embodiment. As can be seen in FIG. 6, the propeller 410 can have various geometries and/or configurations. In the embodiment shown in FIG. 6, the propeller 410 includes a wiper 600, a brush 602, and a nozzle 604. This embodiment of the propeller 410 will be further described with reference to the side view shown in FIG. 7. As shown in FIG. 6, the vat 402 includes an exit channel 606, via which the plastisol/weighting substance mixture exits the vat 402 when the tap 416 (not visible in FIG. 6) is manipulated. It should be understood that this example is illustrative, and therefore should not be construed as being limiting in any way. It can be appreciated from this view in FIG. 6, that the exit channel 606 can be located at or near a bottom 608 of the vat 402, and that the weighting substance can collect near the exit channel 606 if the weighting substance falls out of solution or otherwise precipitates. The illustrated embodiment of the propeller 410 can obviate this issue to at least some extent.

Figure 7:
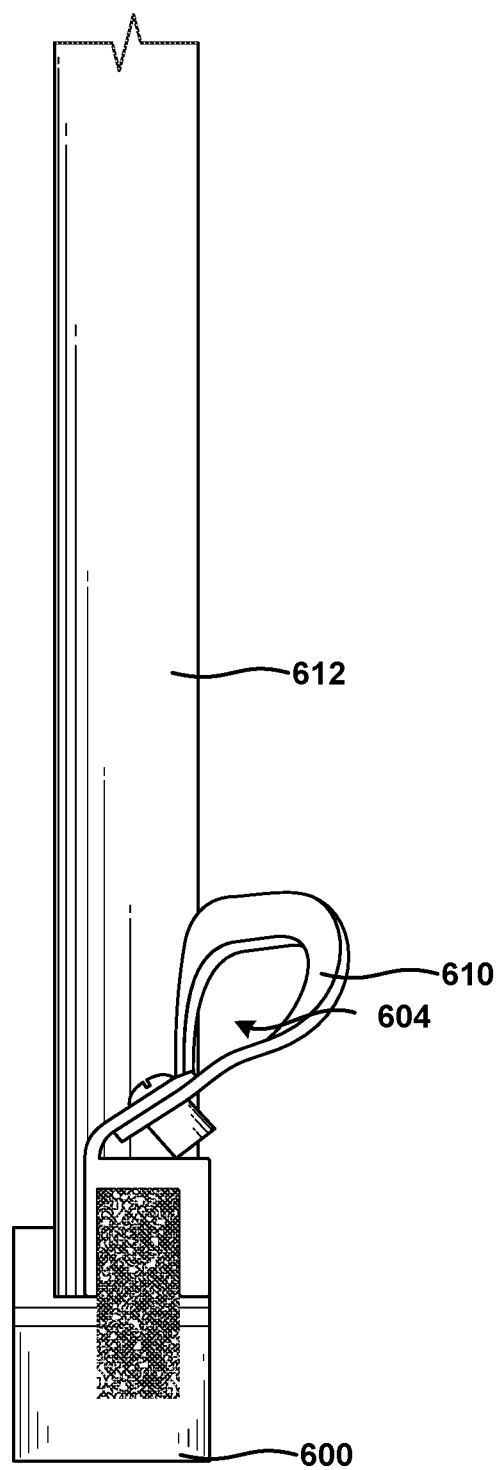

Now with collective reference to FIGS. 6 and 7, the propeller 410 is illustrated. The wiper 600 can include a silicone wiper blade with a reinforced surface. In some embodiments, the wiper 600 is provided by a sheet of steel, hard plastic, or other materials that can be coated in silicone, rubber, or other materials. Thus, the wiper 600 can be stiff enough to resist bending and breaking, but also can have a soft wiping surface that can effectively remove material (e.g., the plastisol/weighting substance mixture) from the bottom 608 of the vat 402. In practice, the wiper 600 can wipe the plastisol/weighting substance mixture off of the vat 402 to return the wiped plastisol/weighting substance mixture into solution.

The brush 602 can be included to wipe remnants of the plastisol/weighting substance mixture from the bottom 608 of the vat 402 and to also return those remnants to solution. The brush 602 can be formed from various materials including, but not limited to, steel, brass, polymers, epoxies, combinations thereof, or the like. The brush 602, then, can serve a similar purpose as the wiper 600 and can ensure that the plastisol/weighting substance mixture at the bottom 608 of the vat 402 is removed and returned to solution with each turn of the drive shaft 412 (and the propeller 410 connected thereto). It should be understood that this example is illustrative, and therefore should not be construed as being limiting in any way.

The nozzle 604 can be included to create a venturi effect and/or a vortex, which can aid in mixing the plastisol with the weighting substance. In particular, the nozzle 604 can be formed in an inclined surface 610. In some embodiments, the inclined surface can be formed with a shape that can be similar to a portion of a twist of an augur. It should be understood that this example is illustrative, and therefore should not be construed as being limiting in any way.

The inclined surface 610 can be configured to urge, pull, and/or push the plastisol/weighting substance mixture up away from the bottom 608 of the vat 402 and back into solution. The nozzle 604 can be configured to create a stirring and swirling effect within the solution. Thus, any portions of the plastisol/weighting substance mixture that are moved by the propeller 410 (including the wiper 600, the brush 602, and the inclined surface 610) can be stirred back into solution by the propeller 410. Because many other geometries for the propeller 410 and/or its various components are contemplated, it should be understood that the illustrated example is illustrative, and therefore should not be construed as being limiting in any way.

Figure 8:
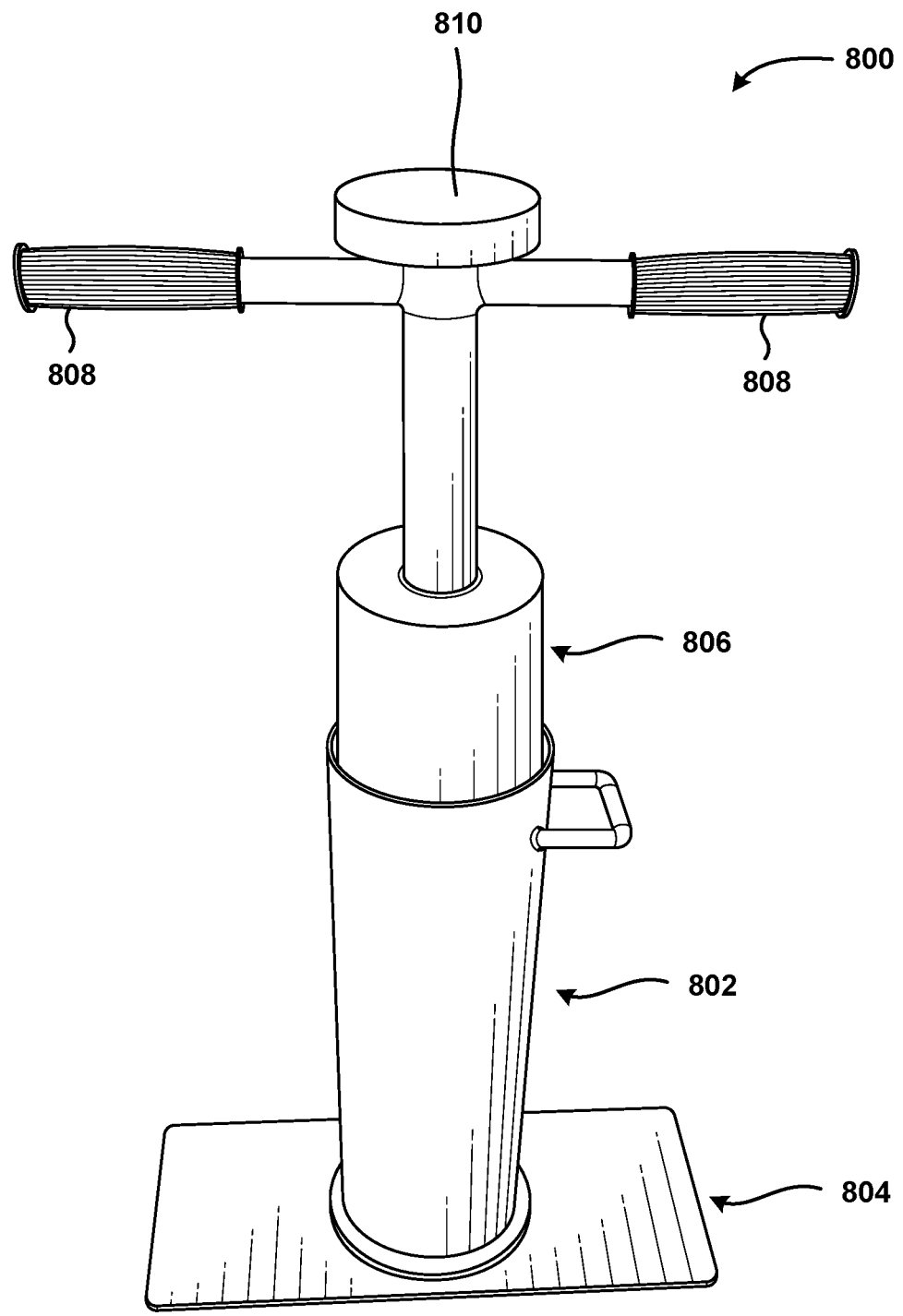
FIG. 8 is a line drawing showing a perspective view of a crushing device, according to an illustrative embodiment of the concepts and technologies described herein.

Now referring to FIG. 8, a crusher 800 is illustrated. As is generally understood, a crusher 800 includes a cylinder 802 attached to a base 804 and a hammer 806 having handles 808. According to various embodiments of the concepts and technologies disclosed herein, the weighting substance can be disposed into the cylinder 802 and the hammer 806 can be inserted into the cylinder 802. Manual force, hammer blows (e.g., on the impact surface 810) or other force can be applied to the weighting substance via the hammer 806 and an inner bottom surface of the cylinder 802 to crush the weighting substance. In some embodiments, the crushing is repeated until a desired consistency of the weighting substance is obtained. Of course, it should be understood that a mechanized crusher can be used to crush the weighting substance, in various embodiments, and as such the crusher can be set to crush the weighting substance to a desired consistency.

According to various embodiments of the concepts and technologies disclosed herein, the weighting substance can be crushed and passed through a screen to obtain particles of a relatively consistent size. According to various embodiments, a number twelve or number fourteen screen can be used. In some instances, a number twelve screen is preferred for purposes of dispersion in the lure, appearance of the finished product, and/or for other reasons. In the illustrated embodiment of the crusher 800 shown in FIG. 8, the cylinder 802 can have a five inch diameter. It should be understood that this example is illustrative, and therefore should not be construed as being limiting in any way.

According to one contemplated embodiment of the concepts and technologies disclosed herein, the weighting substance of the weighted lure 100 can be provided by bismuth, and the mixture can include fifteen to eighteen percent bismuth by volume, six to nine percent salt by volume, and seventy two to seventy eight percent plastisol by volume. A small amount (one to two percent) of dye may also be added (in some cases to the mixture mixed in accordance with the above percentages). Other mixtures are possible and are contemplated. In some embodiments, the plastisol used can include a member of the LURE CRAFT® brand family of materials such as the LURE CRAFT® brand plastisol formula number 502. In some embodiments, two to four ounces of dye per gallon of mixture may be used as well. It should be understood that this example is illustrative, and therefore should not be construed as being limiting in any way.

In another contemplated embodiment, the mixture can include sixteen percent or more bismuth, nine percent salt, the remainder plastisol and dye (to preferred color). This mixture can be heated. In some embodiments, the mixture can be heated to about three hundred fifty degrees Fahrenheit. In some embodiments, the mixture can be mixed using the propeller 410 such as the propellers 410 shown in FIGS. 4 and 6-7. Other types of propellers 410 are contemplated and are possible. Also, the tilt of the propeller 410 (e.g., blades or other geometry of the propeller 410) can be varied to increase or decrease the resulting vortex with or without adjusting speed. Thus, the illustrated embodiment is illustrative and should not be construed as being limiting in any way.

The temperature to which the plastisol is heated can be varied depending on the application, the weighting substance used, and/or other considerations. In some embodiments, the plastisol/weighting substance may be cooled before filling a mold. In particular, the applicant has discovered that cooling the mixture to about three hundred ten to three hundred fifteen degrees Fahrenheit before filling the molds can help prevent the weighting substance from coming out of dispersion and/or settling in the molds. It should be understood that this example is illustrative, and therefore should not be construed as being limiting in any way.

In another embodiment, the mixture can include seventy two point five percent (by volume) plastisol; seventeen percent (by volume) bismuth; nine percent (by volume) salt (NaCl is being used, though other salts can be used instead); and one and a half percent (by volume) dye. It should be understood that this example is illustrative, and therefore should not be construed as being limiting in any way.

With regard to the speed needed to keep the bismuth in solution in the vat, the applicant has discovered that a variable speed motor can be ideal to prevent creating air cavities in the weighted lures 100. In particular, the applicant has discovered that when the vat 402 is full, the speed of the motor may be comparatively higher than when the vat 402 is less than full. Namely, the applicant has discovered that a rotational speed in the range of five hundred to one thousand RPM range will work for most embodiments to prevent cavitation of the weighted lures, with the rotational speed being decreased linearly as the plastisol/weighting substance mixture is used to form the weighted lures 100. In particular, the rotational speed of the propeller 410 when the vat 402 is full can be set to one thousand RPM and linearly reduced as the plastisol/weighting substance mixture is consumed such that the rotational speed of the propeller 410 will be five hundred RPM when the vat 402 is empty. It should be understood that this example is illustrative, and therefore should not be construed as being limiting in any way.

The applicant also has discovered that the propeller 410 can be reversed to push the plastisol/weighting substance mixture down into the vat 402 (instead of sending mixture up). This can help reduce cavitation more than turning the propeller 410 in a forward direction (that urges the plastisol/weighting substance mixture up as in the embodiment shown in FIGS. 6-7). It should be understood that this example is illustrative, and therefore should not be construed as being limiting in any way.

Figure 9:
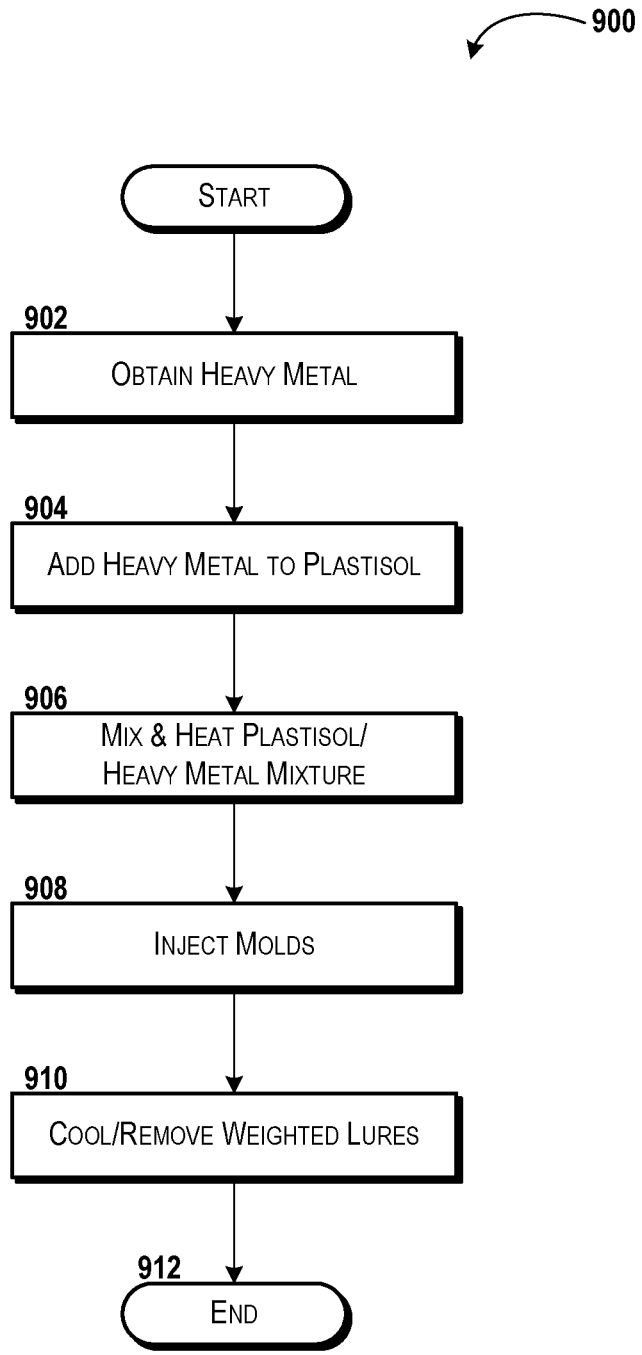
FIG. 9 schematically illustrates a method for forming a weighted lure, according to an example embodiment of the concepts and technologies disclosed herein.

Turning now to FIG. 9, aspects of a method 900 for forming a weighted lure 100 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the lure manufacturing device, to perform one or more operations and/or causing the processor to direct other components of the computing system or device to perform one or more of the operations.

For purposes of illustrating and describing the concepts of the present disclosure, the method 900 is described herein as being performed by the lure manufacturing device via execution of one or more software modules such as, for example, a lure manufacturing application. It should be understood that additional and/or alternative devices and/or network nodes can provide the functionality described herein via execution of one or more modules, applications, and/or other software including, but not limited to, the lure manufacturing application. Thus, the illustrated embodiments are illustrative, and should not be viewed as being limiting in any way.

The method 900 begins at operation 902. At operation 902, the lure manufacturing device can crush the bismuth or other weighting substance to a desired consistency. As noted above, the desired consistency can be such that the bismuth or other weighting substance passes through a number twelve or a number fourteen screen. It also should be understood that the bismuth or other weighting substance can be obtained crushed, powdered, or the like, or crushed by other means (e.g., powdered tungsten, bismuth, or other weighting materials can be used, in some embodiments). It should be understood that this example is illustrative, and therefore should not be construed as being limiting in any way.

From operation 902, the method 900 can proceed to operation 904. At operation 904, the lure manufacturing device can add the crushed (and sized) bismuth or other weighting substance to plastisol according to a desired percentage. In some embodiments, multiple density weighted lures 100 may be formed by adding more or less bismuth or other weighting substance to the mixture and forming one or more portions of the weighted lures 100 with different density mixtures. In one contemplated embodiment, a mixture with little to no bismuth or other weighting substance can be used to form a light part of the lure (by injecting part of the mold as set off by a divider), and then a remainder of the mold can be filled with a weighted mixture as illustrated and described herein. Alternatively, as will be explained in more detail below, a weighted portion of the weighted lure 100 can be formed, located in a mold, and then the mold can be filled with an unweighted mixture. It should be understood that this example is illustrative, and therefore should not be construed as being limiting in any way.

From operation 904, the method 900 can proceed to operation 906. At operation 906, the lure manufacturing device can mix and heat the mixture. According to various embodiments, the plastisol can be heated. In some embodiments, the plastisol can be heated to about three hundred fifty degrees Fahrenheit. In some embodiments, the plastisol can be cooled to about three hundred ten degrees Fahrenheit before injection. It should be understood that this example is illustrative, and therefore should not be construed as being limiting in any way.

The mixing of the mixture can be accomplished with the device as shown in the machine 400 illustrated and described herein. In some embodiments, the mixture is mixed at one thousand RPM and the RPM is linearly reduced as the mixture is consumed so that the RPM is five hundred when the vat 402 is empty. As noted above, the propeller 410 can be reversed in various embodiments. It should be understood that this example is illustrative, and therefore should not be construed as being limiting in any way. Because other rotational speeds may be used (e.g., as the size of the vat 402 changes) and/or because other methods of mixing the mixture may be used, it should be understood that this example is illustrative, and therefore should not be construed as being limiting in any way.

From operation 906, the method 900 can proceed to operation 908. At operation 908, the lure manufacturing device can inject the molds to form the weighted lures 100. As noted above, multiple-density versions of the weighted lures can be formed by injecting a first part of the mold with a first density mixture and a second part of the mold with a second density mixture. Two or more than two densities can be included, if desired. Thus, operations 902-908 can be iterated any number of times until the weighted lure with desired densities is formed. It should be understood that this example is illustrative, and therefore should not be construed as being limiting in any way.

From operation 908, the method 900 can proceed to operation 910. At operation 910, the lure manufacturing device can cool the weighted lure 100 and/or remove the weighted lure 100 from the mold. From operation 910, the method 900 can proceed to operation 912. The method 900 can end at operation 912.

Figure 10:
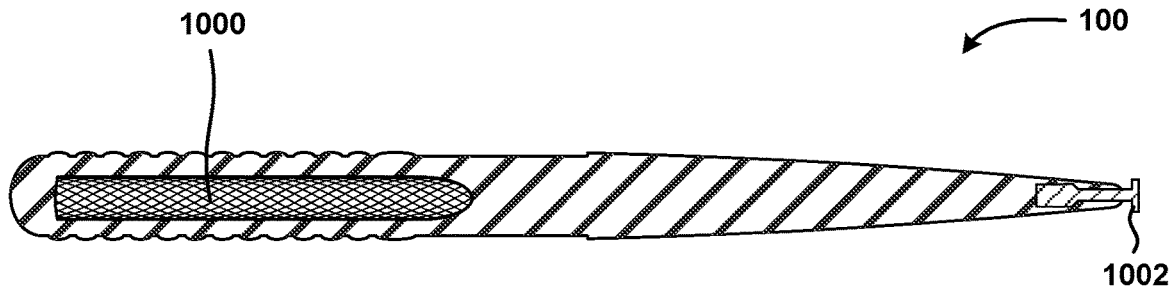
FIGS. 10-12 are line drawings showing cross-sectional views of a weighted lure, according to another example embodiment of the concepts and technologies disclosed herein.
Figure 11:
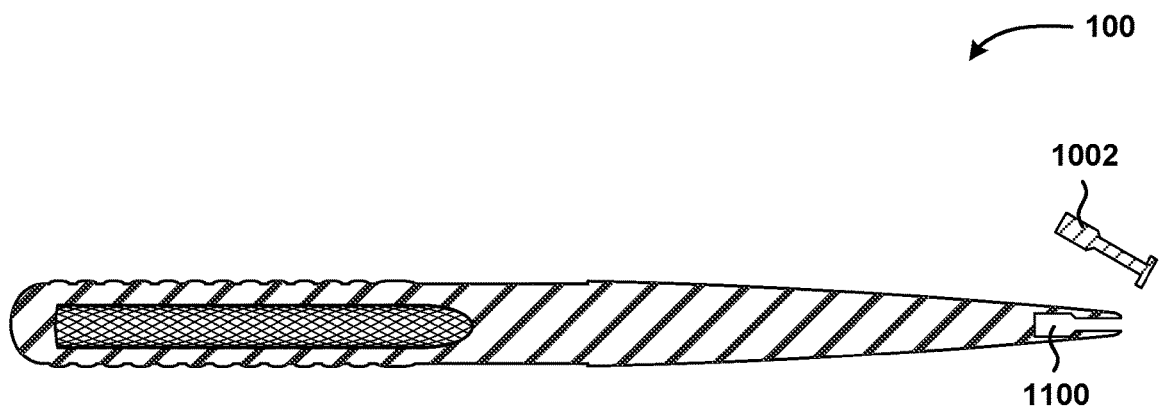
Figure 12:
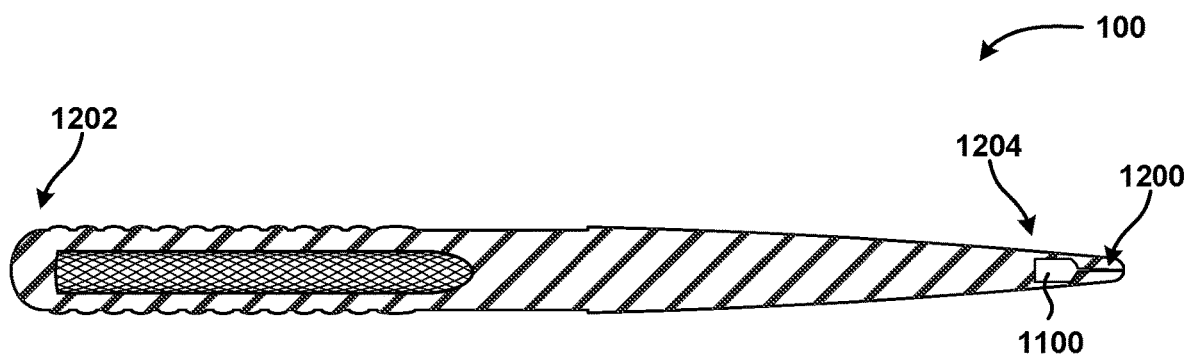

Turning now to FIGS. 10-12, another embodiment of the weighted lures 100 illustrated and described herein will be described in detail. In particular, the exterior of the weighted lures 100 shown in FIGS. 10-12 can be substantially identical to the weighted lures 100 shown in FIG. 1. The cross-sectional views, however, can differ substantially from those shown in FIGS. 2-3 and therefore will be used to describe this embodiment of the weighted lures 100. According to various embodiments, the embodiment of the weighted lures 100 shown in FIGS. 10-12 are referred to by the assignee as DIVE BOMBERS brand weighted lures 100.

It should be understood that this example is illustrative, and therefore should not be construed as being limiting in any way.

The weighted lures 100 shown in FIGS. 10-12 can be formed with a weighted portion 1000 that can be internally located (e.g., formed within the weighted lure 100). It should be understood that the shape of the weighted portion 1000 shown in FIGS. 10-12 is illustrative and should not be construed as being limiting in any way. In particular, the weighted portion 1000 can have any shape, size, dimensions, relative size, and/or relative dimensions (relative to the body of the weighted lure 100). As such, the illustrated embodiment is illustrative and should not be construed as being limiting in any way.

The weighted portion 1000 can be formed, in some embodiments, by creating a high density plastisol in accordance with the various embodiments illustrated and described hereinabove. A high density plastisol can be made using bismuth, tungsten, steel, iron, other metals, other materials, combinations thereof, or the like. In some embodiments, the percentage of weighting substance by volume of the plastisol/weighting substance mixture used to provide the high density plastisol can be about ten percent. In some embodiments, the percentage of weighting substance by volume of the plastisol/weighting substance mixture used to provide the high density plastisol can exceed twenty percent. In some embodiments, the percentage of weighting substance by volume of the plastisol/weighting substance mixture used to provide the high density plastisol can exceed thirty percent. In some embodiments, the percentage of weighting substance by volume of the plastisol/weighting substance mixture used to provide the high density plastisol can exceed forty percent. In some embodiments, the percentage of weighting substance by volume of the plastisol/weighting substance mixture used to provide the high density plastisol can exceed fifty percent. In some embodiments, the percentage of weighting substance by volume of the plastisol/weighting substance mixture used to provide the high density plastisol can exceed sixty percent. In some preferred embodiments, the percentage of weighting substance by volume of the plastisol/weighting substance mixture used to provide the high density plastisol can range from a minimum of about ten percent to a maximum of about sixty percent, though lower and higher percentages are contemplated as explained herein. It should be understood that these examples are illustrative, and therefore should not be construed as being limiting in any way.

The shape of the weighted portion 1000 is illustrative and should not be construed as being limiting in any way. After forming the weighted portion 1000, unweighted plastisol can be used to encase the weighted portion 1000. As used herein, the term "encase" can be used to refer to the weighted portion 1000 being surrounded on all sides by the unweighted plastisol (or other material used to form the body of the weighted lure 100), though as will be explained below pin holes may exist in the encasing material from manufacturing of the weighted lure 100 and/or from other causes. Thus, the term "encasing" can refer to substantially surrounding the weighted portion 1000 notwithstanding air bubbles, pin holes, or other interruptions, intervening substances, and/or intervening structures/materials that are possible and are contemplated.

In the illustrated embodiment shown in FIG. 10, the unweighted plastisol is formed into a shape of a worm. It should be understood that this example is illustrative, and therefore should not be construed as being limiting in any way. Because the weighted portion 1000 can be formed from a plastisol/weighting substance mixture, the weighted portion 1000 can be completely joined to the unweighted plastisol, thereby forming a single weighted lure 100 that is durable and unlikely to fail (e.g., the weighted portion 1000 is unlikely to fall out of the weighted lure 100). As will be explained in more detail below, the weighting of one end of the weighted lure 100 (by using the weighted portion 1000) can cause one end of the weighted lure 100 to sink, thereby mimicking worms and increasing the effectiveness of the weighted lure 100. It should be understood that this example is illustrative, and therefore should not be construed as being limiting in any way.

The weighted lure 100 shown in FIG. 10 is also illustrated as including a removable air pocket pin 1002. It can be appreciated that the dimensions and/or relative dimensions of the removable air pocket pin 1002 are illustrative and should not be construed as being limiting in any way. The removable air pocket pin 1002 can be located in a mold used to form the weighted lure 100 before forming the weighted lure 100. Thus, the plastisol/weighting substance mixture (or unweighted plastisol) can encompass the removable air pocket pin 1002. Upon removal of the removable air pocket pin 1002 from the weighted lure 100, as shown in FIG. 11, an air pocket 1100 can be formed. As shown in FIG. 12, the air pocket 1100 can be sealed by heat, glued, fused, a positive pressure roll sear, or otherwise sealed to create a seal 1204 that can enclose the air pocket 1100. Thus, when the weighted lure 100 that includes the air pocket 1100 is put into water, the head 1202 can sink (due to the inclusion therein of the weighted portion 1000), and the tail 1200 can rise (due to the inclusion therein of the air pocket 1100). It should be understood that this example is illustrative, and therefore should not be construed as being limiting in any way.

As used in the claims with regard to embodiments of the weighted lures 100 shown in FIGS. 10-12, the term "body" can be used to refer to the entirety of the weighted lure 100 other than the weighted portion 1000. It should be understood that this example is illustrative, and therefore should not be construed as being limiting in any way.

Figure 13:
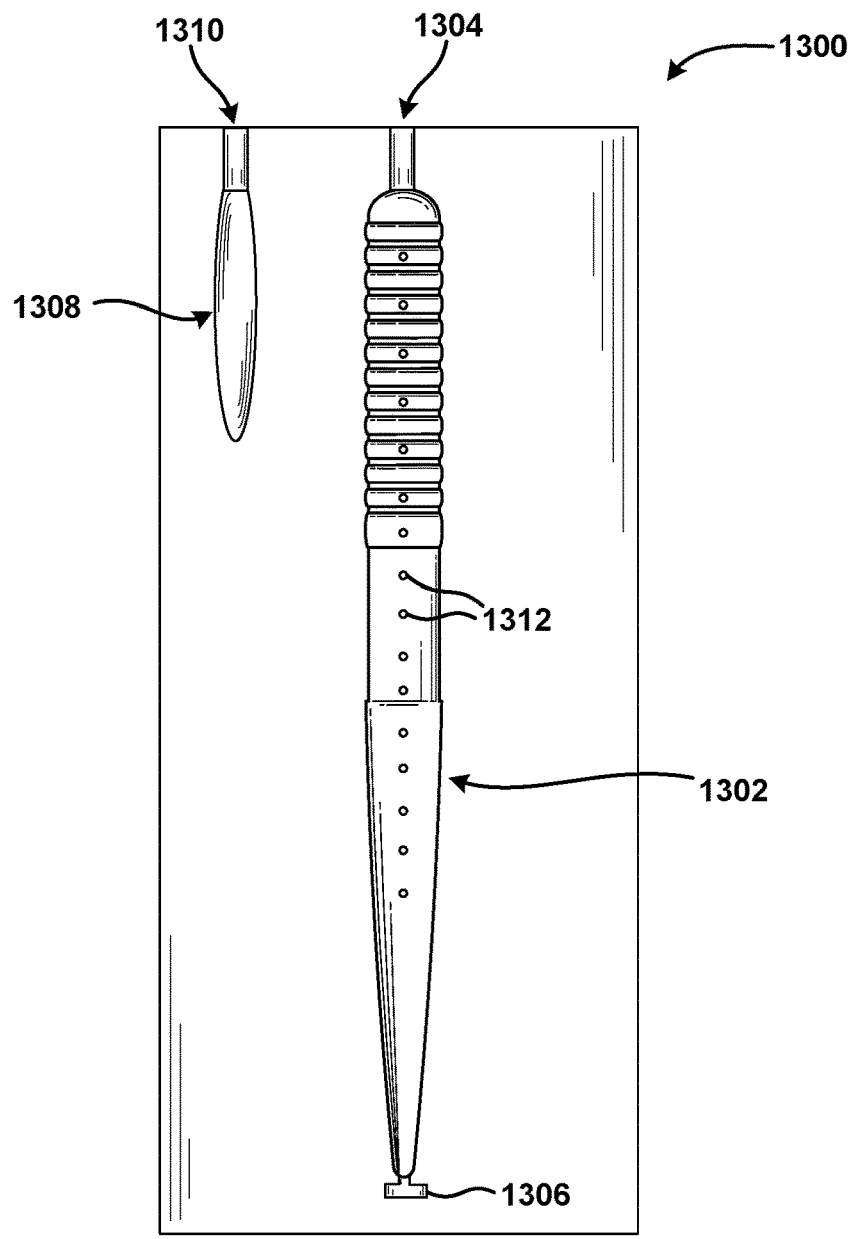
FIGS. 13-15 are line drawings showing various views of a mold for forming a weighted lure, according to one example embodiment of the concepts and technologies disclosed herein.
Figure 14:
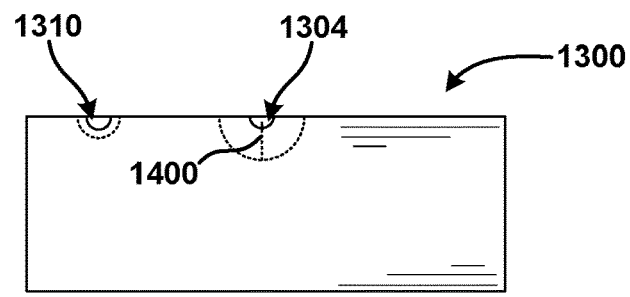
Figure 15:
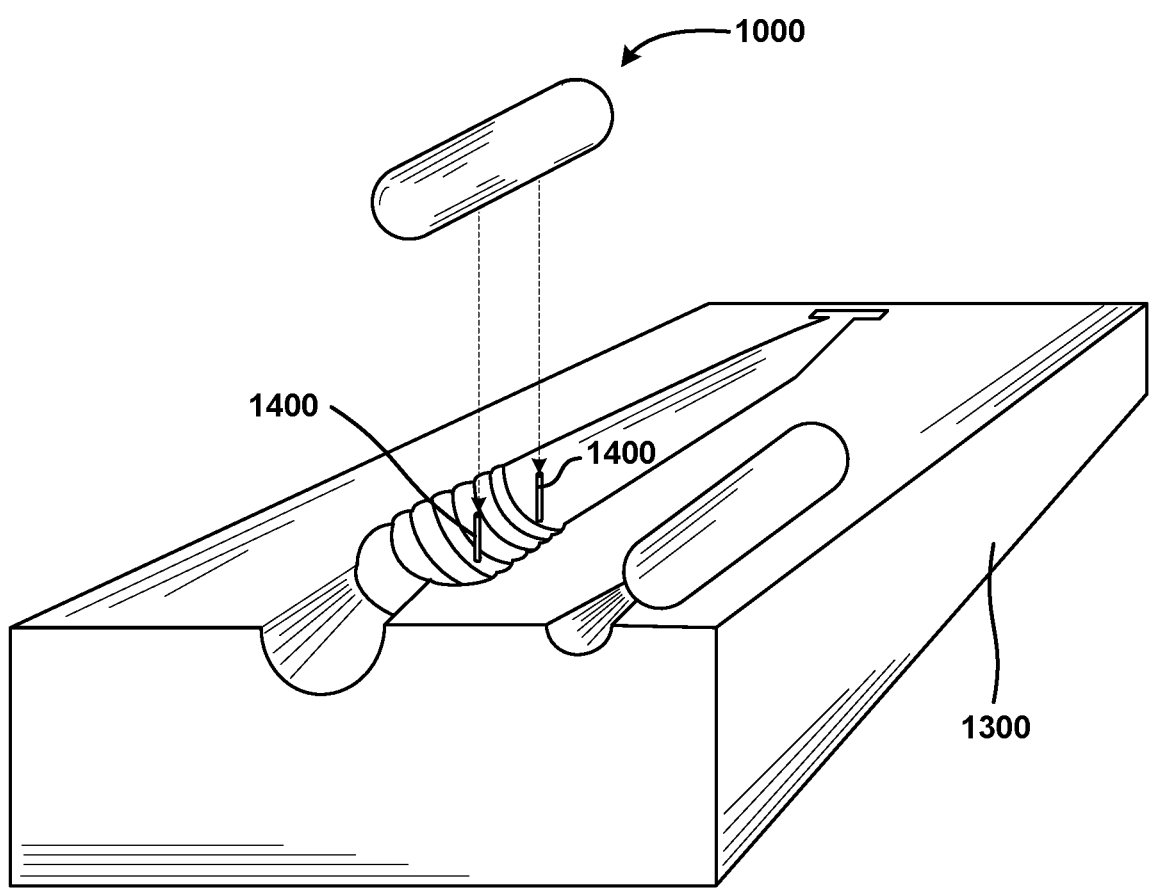

Turning now to FIGS. 13-15, some example molds for forming the weighted lure 100 illustrated and described in FIGS. 10-12 will be described in detail. In particular, FIG. 13 is a line drawing illustrating a top plan view of a mold 1300 for use in forming a weighted lure 100, according to an example embodiment. The mold 1300 includes a worm shape 1302. As noted above, the worm shape 1302 is used for illustration, but other shapes are possible and are contemplated for the weighted lure 100. Thus, the claims are not directed to a worm-shaped lure unless the shape and/or portions of the shape (e.g., a head, tail, ridged portion, clitellum) are recited in the claims.

The mold 1300 also can include an inlet 1304 for injecting material into the worm shape 1302. Thus, to form a worm-shaped lure (e.g., the weighted lures 100 shown in FIG. 1), one or more materials (e.g., the plastisol/weighting substance mixtures illustrated and described herein) can be injected into the worm shape 1302 via the inlet 1304. It should be understood that this example is illustrative, and therefore should not be construed as being limiting in any way.

The mold 1300 is also shown as including a removable air pocket pin fixture 1306. This fixture can be configured to engage and hold a removable air pocket pin 1002 in place during filling and/or curing of material put into the mold 1300. The mold 1300 also is illustrated as including a weighted portion mold 1308 and an insert channel 1310 for filling the weighted portion mold 1308. According to various embodiments, the weighted portion 1000 can be formed in a separate mold and therefore this illustrated embodiment is illustrative and should not be construed as being limiting in any way. Also, although not visible in FIG. 13, it can be appreciated that the weighted portion mold 1308 can include structures for forming the nubs 302 illustrated and described above with reference to FIG. 3. As such, this embodiment is illustrative and should not be construed as being limiting in any way.

The mold 1300 also includes pin holes 1312 and pins (not distinguishable from the pin holes 1312 in FIG. 13). FIG. 14 shows a side elevation view of the mold 1300, and a pin 1400 is visible in that view. FIG. 15 shows a perspective view of the mold 1300.

The weighted lures 100 shown in FIGS. 10-12 and methods of forming those weighted lures 100 (e.g., using the mold 1300 shown in FIGS. 13-15) will now be described in more detail. The weighted portion 1000 can be formed, in some embodiments, by filling the weighted portion mold 1308 with a high density plastisol as described herein. In one embodiment, the plastisol can be heated with a powder, dust, or other material that can be formed from tungsten, bismuth, or other weighting materials to form a high density plastisol/weighting substance mixture. The weighted portion 1000 can be allowed to cool and can be removed from the mold 1300 (or other mold, if desired). The weighted portion 1000 can be placed onto one or more pins 1400 (inserted into the pin holes 1312 of the mold 1300) to hold the weighted portion in place. In some embodiments, the weighted portion 1000 can be placed on the pins 1400 such that the weighted portion 1000 will be centered within the weighted lure 100 (e.g., if the weighted lure is round and if the weighted portion 1000 is round, the diameter of the weighted portion 1000 can be centered within a diameter of the weighted lure 100), though the weighted portion 1000 can be located at any point along the length of the weighted lure 100 as illustrated and described herein. Of course, other shapes are possible, and the weighted portion 1000 need not necessarily be centered within the body of the weighted lure 100 (e.g., encased by substantially equal amounts of material on all sides from the center to an outer edge) in all embodiments. As such, it should be understood that this described embodiment is illustrative, and therefore should not be construed as being limiting in any way.

The mold 1300 can be closed and a plastisol/weighting substance mixture or unweighted plastisol (or other material) can be used to fill the worm shape 1302 of the mold 1300 via the inlet 1304 and allowed to cool. After cooling, a weighted lure 100 can be removed from the mold 1300. By varying the position of the weighted portion 1000 in the mold 1300 (e.g., by moving the pins 1400 among the pin holes 1312), the behavior of the weighted lure 100 in the water can be modified.

In some embodiments, the weighted lures 100 shown in FIGS. 10-12 can include an air pocket 1100 in the tail 1200, as shown in FIG. 12. Thus, another method of forming weighted lures 100 (e.g., using the mold 1300 shown in FIGS. 13-15) will now be described in more detail.

The weighted portion 1000 can be obtained or formed. As noted above, the weighted portion 1000 can be formed, in some embodiments, by filling the weighted portion mold 1308 with a high density plastisol as described herein. In one embodiment, the plastisol can be heated with a powder or dust formed from tungsten, bismuth, or other weighting materials to form a high density plastisol/weighting substance mixture. The weighted portion 1000 can be allowed to cool and can be removed from the mold 1300 (or other mold, if desired). The weighted portion 1000 can be placed onto one or more pins 1400 (inserted into the pin holes 1312 of the mold 1300) to hold the weighted portion in place. A removable air pocket pin 1002 can be located in the removable air pocket pin fixture 1306. The mold 1300 can be closed and a plastisol/weighting substance mixture or unweighted plastisol (or other material) can be used to fill the worm shape 1302 of the mold 1300 via the inlet 1304 and allowed to cool. After cooling, a weighted lure 100 can be removed from the mold 1300 and the removable air pocket pin 1002 can be removed from the weighted lure 100. The air pocket 1100 can be sealed (e.g., by creation of the seal 1204). Thus, a weighted lure 100 with a head 1202 that sinks in the water (due to its being weighted more than the other portions of the weighted lure 100) and an air pocket 1100 that can cause the tail 1200 to rise (due to its being weighted less and/or being more buoyant than other portions of the weighted lure 100) can be obtained. It should be understood that this example is illustrative, and therefore should not be construed as being limiting in any way.

Figure 16:
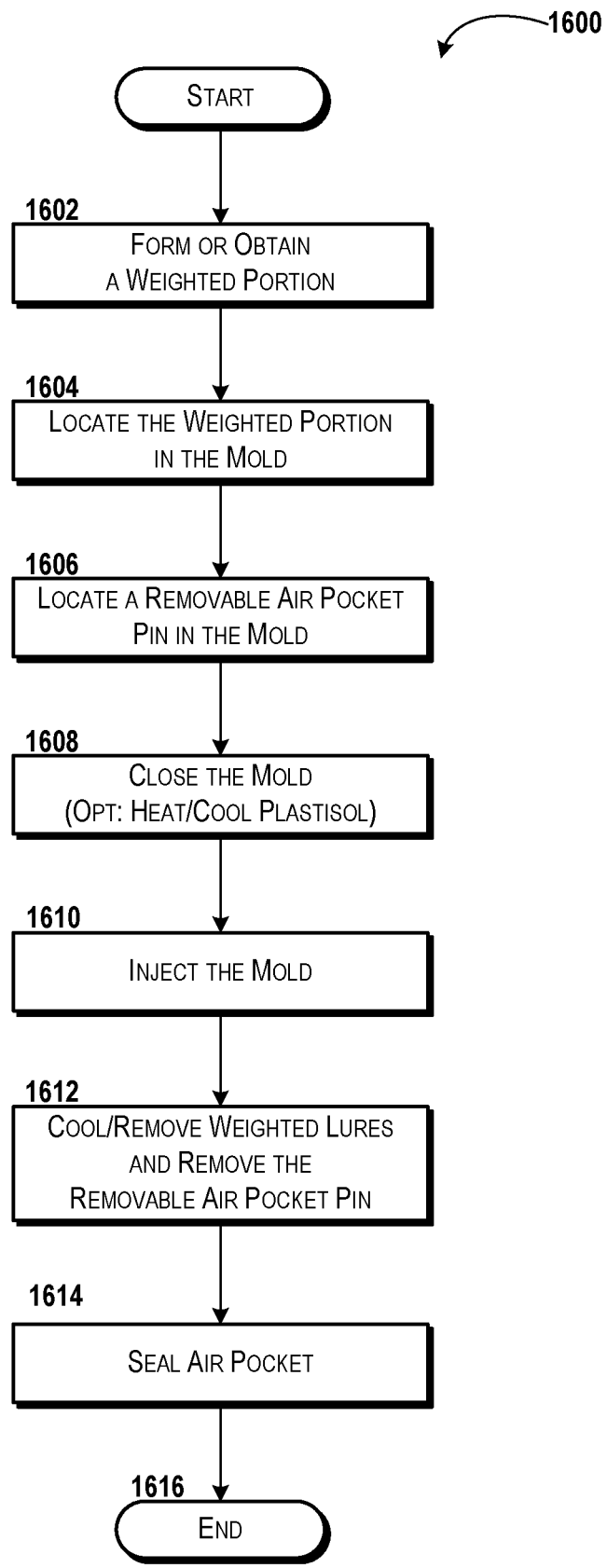
FIG. 16 schematically illustrates a method for forming a weighted lure, according to another example embodiment of the concepts and technologies disclosed herein.

Turning now to FIG. 16, aspects of a method 1600 for forming a weighted lure 100 will be described in detail, according to another illustrative embodiment. The method 1600 begins at operation 1602. At operation 1602, a weighted portion 1000 can be formed. As explained above, the weighted portion 1000 can be formed from a high density plastisol mixture such as a mixture of plastisol and a weighting substance (e.g., crushed bismuth, tungsten powder, or other weighting materials in other forms) having from about ten percent to about sixty percent tungsten, bismuth, or other weighting materials by volume. The high density plastisol can be heated. In some embodiments, the high density plastisol can be heated to three hundred fifty degrees Fahrenheit. In some embodiments, the high density plastisol can be cooled before injection. In some embodiments, the high density plastisol can be cooled to about three hundred ten degrees Fahrenheit before injection. The high density plastisol mixture can be injected into a weighted portion mold 1308 (e.g., a portion of the mold 1300 and/or a standalone mold) to form the weighted portion 1000. After cooling, the weighted portion 1000 can be removed from the mold. It should be understood that this example is illustrative, and therefore should not be construed as being limiting in any way.

From operation 1602, the method 1600 can proceed to operation 1604. At operation 1604, the weighted portion 1000 obtained in operation 1602 can be located within a mold 1300. As explained above with reference to FIGS. 13-15, the mold 1300 can include pins 1400, which can be moved among the pin holes 1312 to locate the weighted portion 1000 at a desired location within the mold 1300. Because the weighted portion can be formed from a plastisol/weighted substance mixture, the weighted portion 1000 can be pierced by the pins 1400 and held in place thereby. It should be understood that this example is illustrative, and therefore should not be construed as being limiting in any way.

From operation 1604, the method 1600 can proceed to operation 1606. At operation 1606, a removable air pocket pin 1002 can be located in the mold 1300, for example in the removable air pocket pin fixture 1306 illustrated and described above with reference to FIG. 13.

From operation 1606, the method 1600 can proceed to operation 1608. At operation 1608, the mold can be closed. The plastisol can be heated before this operation or at this time. Either an unweighted plastisol can be used or a plastisol/weighting substance mixture can be used. In some embodiments, the plastisol can be heated to about three hundred fifty degrees Fahrenheit. In some embodiments, the plastisol can be cooled to about three hundred ten degrees Fahrenheit before injection. It should be understood that this example is illustrative, and therefore should not be construed as being limiting in any way.

From operation 1608, the method 1600 can proceed to operation 1610. At operation 1610, the mold 1300 can be injected with the plastisol to form the weighted lures 100. The plastisol injected into the mold 1300 can engulf/surround the weighted portion 1000 and the removable air pocket pin 1002. It should be understood that this example is illustrative, and therefore should not be construed as being limiting in any way.

From operation 1610, the method 1600 can proceed to operation 1612. At operation 1612, the weighted lure 100 can be cooled and/or removed from the mold 1300. The removable air pocket pin 1002 can also be removed from the weighted lure 100 (if desired).

From operation 1612, the method 1600 can proceed to operation 1614. At operation 1614, the air pocket 1100 can be sealed to create the air pocket 1100. In various embodiments, the air pocket 1100 can be sealed by heat, can be sealed by glue, can be fused, can be sealed using a positive pressure roll sear, or otherwise can be sealed to create a seal 1204 that can enclose the air pocket 1100. From operation 1614, the method 1600 can proceed to operation 1616. The method 1600 can end at operation 1616.

The above description has described various materials that can be used to form a weighted lure 100. In particular, the various embodiments have been described as being formed from plastisol and a weighting substance such as bismuth, tungsten, or other materials. In various embodiments, tungsten is preferred, and in some other embodiments, bismuth is preferred. Tungsten can be preferred in some embodiments because tungsten powder is easily obtained and therefore is less work-intensive than some alternative materials such as bismuth (which may have to be crushed, etc.). Also, tungsten is, by cubic centimeter, one of the densest materials available on earth, measuring approximately nineteen point thirty five grams per cubic centimeter (compared to lead, which measures approximately eleven point thirty five grams per cubic centimeter). Also, the cost of tungsten (fifty dollars or less per pound) can be cheap compared to some other heavy metals (e.g., compared to gold, which has approximately the same density as tungsten but costs about nineteen thousand dollars per pound at current prices). Thus, tungsten can be a preferred material, in some embodiments. It should be understood, however, that other materials can be used without departing from the scope of this disclosure.

Similarly, while the above description has described use of plastisol as a bearing medium for dispersed weighting substance (e.g., bismuth particles, tungsten powder, etc.), it should be understood that other materials are possible and are contemplated. In particular, in some embodiments, silicone, soft plastics, elastic polymers, other polymers, and/or other materials can be used instead of, or in addition to, plastisol. For example, in some embodiments a silicone/weighting substance mixture can be used to form the weighted lures 100 and/or one or more portions thereof. In one contemplated embodiment, the weighted insert 300 and/or the weighted portion 1000 can be formed from a silicone/weighting substance mixture, with the remainder of the weighted lure 100 being formed from silicone, plastisol, and/or other materials including those disclosed herein and other known materials.

While the above description has also disclosed a percentage of weighting substance from about ten percent up to about sixty percent, these ranges can be adjusted further. The upper limit of the weighting substance can be reached in various ways. For example, an upper limit may be deemed reached if the weighted lure 100 substantially loses its elasticity due to the percentage of weighting substance. As another example, an upper limit may be deemed reached if the weighted lure 100 becomes brittle, cracks, or otherwise fails due to the percentage of weighting substance. As another example, an upper limit may be deemed reached if the weighted lure 100 becomes too expensive in terms of raw materials and/or because of work required to form the weighted lure 100 due to the percentage of weighting substance. Because limits can be reached in additional and/or alternative manners, it should be understood that these examples are illustrative, and therefore should not be construed as being limiting in any way.

In some embodiments, the dimensions of the weighted insert 300 and/or the weighted portion 1000 can be varied to increase or decrease overall weight of the weighted lures 100. In some embodiments, this can allow changes to behavior of the weighted lures 100 (in the water) without adjusting percentages of the weighting substance in the material(s) used to form the weighted lures 100 and/or components thereof (e.g., the weighted insert 300, the weighted portion 1000, if included). According to various embodiments, the overall weight of the weighted lure 100 can be varied in various ways including, but not limited to, adjusting the size and/or dimensions of the weighted lure 100, by adjusting percentages of weighting substance in the weighted lures 100, by adjusting percentages of weighting substance in components of the weighted lures 100 (e.g., the weighted insert 300, the weighted portion 1000, etc.), by altering the size, dimensions, relative size, and/or relative dimensions (relative to other components and/or features) of components and/or features of the weighted lures 100 (e.g., the air pocket 1100, the weighted insert 300, the weighted portion 1000, etc.). In some contemplated embodiments, the total weight of the weighted lure 100 can be less than one quarter of an ounce, one quarter of an ounce, three-eighths of an ounce, one half of an ounce, or more than one half of an ounce. Other total weights (less than one-quarter of an ounce and more than one half of an ounce) are contemplated, and the discrete weights listed above are example embodiments (i.e., any weight is possible for the weighted lure 100 and therefore the total weight is not limited to the above-listed values).

Figure 17:
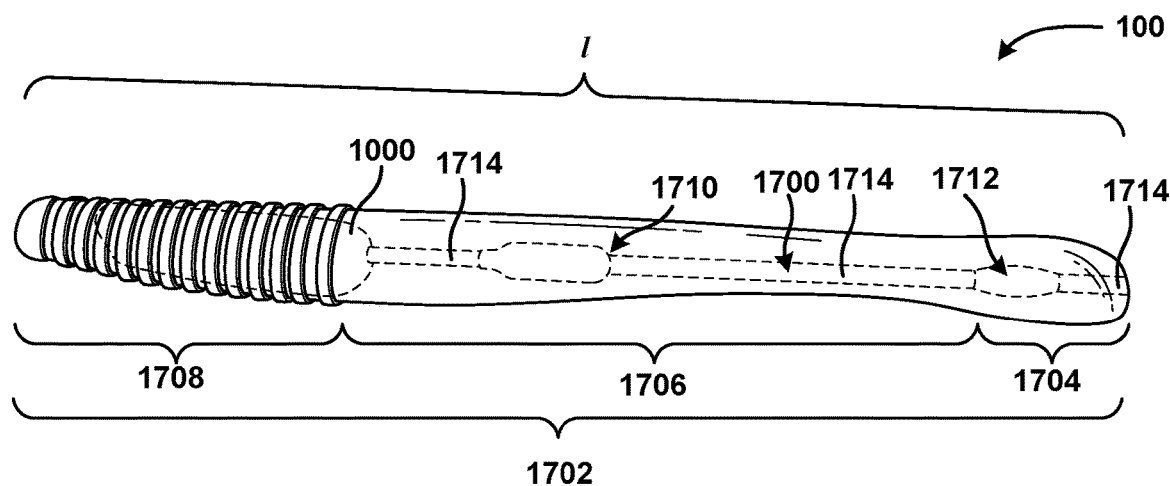
FIG. 17 is a line drawing showing a weighted lure, according to another example embodiment of the concepts and technologies disclosed herein.
Figure 18:
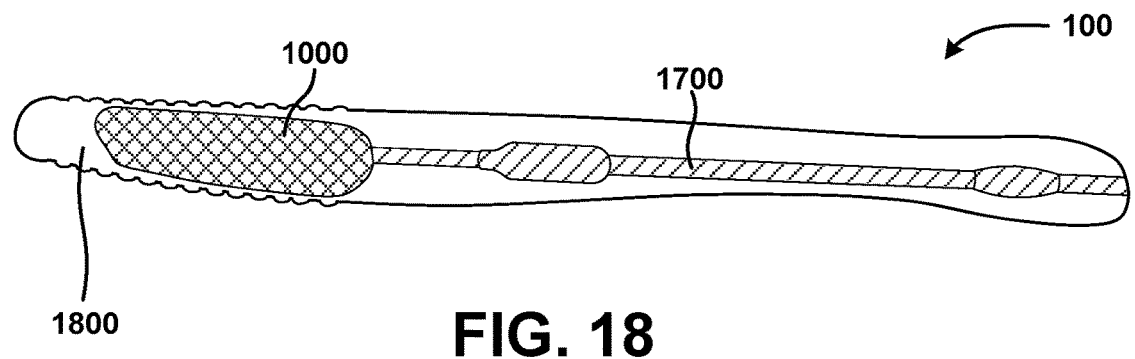
FIG. 18 is a line drawing showing a cross-sectional view of a weighted lure, according to another example embodiment of the concepts and technologies disclosed herein.

Turning now to FIGS. 17-18, another embodiment of a weighted lure 100 illustrated and described herein will be described in detail. In particular, the exterior of the weighted lures 100 shown in FIG. 17 can be, but are not necessarily, similar to the weighted lures 100 shown in FIGS. 1 and 10-12. As shown in FIG. 17, the weighted lure 100 can have a body 1702. The body 1702 can have a tail end 1704, a body portion 1706, and a head end 1708. It should be understood that this example is illustrative, and therefore should not be construed as being limiting in any way.

The embodiment of the weighted lure 100 shown in FIG. 17, however, can include an air chamber 1700 in the interior of the weighted lure 100. The air chamber 1700 can extend, in some embodiments such as that shown in FIG. 17, from a tail end 1704 of the weighted lure 100 to a beginning of a head end 1708 of the weighted lure 100. In the illustrated embodiment, the air chamber 1700 includes a continuous opening in the weighted lure 100 that extends from the tail end 1704 of the weighted lure 100 to the weighted portion 1000 of the weighted lure 100. It should be understood that this example is illustrative, and therefore should not be construed as being limiting in any way.

As shown in FIG. 17, the air chamber 1700 can have a varied diameter at various points along the air chamber 1700. In particular, the air chamber 1700 can have an increased diameter at various portions along the length of the air chamber 1700 for purposes of modifying the buoyancy of the weighted lure 100. In the illustrated embodiment, the air chamber 1700 is illustrated as having an increased diameter at a point near a center of the length/of the weighted lure 100. In some embodiments, this portion having the increased diameter can be included to cause the tail end 1704 and/or the body portion 1706 of the body 1702 to float more (e.g., to have a greater buoyancy) than the head end 1708 of the body 1702 of the weighted lure 100.

In the illustrated embodiment, the air chamber 1700 is also illustrated as having an increased diameter at a point near the tail end 1704 of the weighed lure 100. In some embodiments, this portion having the increased diameter can be included to cause the tail end 1704 to float more (e.g., to have a greater buoyancy) than the head end 1708 of the weighted lure 100, and therefore can cause the head end 1708 of the weighted lure 100 to be lower than the tail end 1704 of the weighted lure 100, an arrangement that may attract fish more than a weighted lure 100 having a tail end 1704 that does not float more than the head end 1708 and/or the body 1702. It should be understood that this example is illustrative, and therefore should not be construed as being limiting in any way.

Thus, some embodiments of the weighted lure 100 can have an air chamber 1700 that includes a body chamber 1710 and/or a tail chamber 1712. The portion of the air chamber 1700 between the body chamber 1710 and the tail chamber 1712 can be referred to herein as an air chamber shaft 1714. The air chamber 1700 can have substantially similar structures (similar to the air chamber shaft 1714) between the body chamber 1710 and the weighted portion 1000 and between the tail chamber 1712 and the end of the air chamber 1700 and/or the end of the weighted lure 100. Thus, the "air chamber shaft 1714" can refer to this shaft shaped portion of the air chamber 1700 at various locations along the length of the air chamber 1700, as labeled in FIG. 17. It should be understood that this example is illustrative, and therefore should not be construed as being limiting in any way.

It can be appreciated with reference to FIG. 17 that the air chamber shaft 1714 can have a cylindrical shape and can have a first diameter. The body chamber 1710 can be substantially cylindrical as well and can have a second diameter. The tail chamber 1712 also can be cylindrical and/or ellipsoidal and can have a third diameter. These diameters can change over the length of the respective structures (e.g., the body chamber 1710, the air chamber shaft 1714, and the tail chamber 1712).

In the illustrated embodiment, the average diameter of the body chamber 1710 over the length of the body chamber 1710 can be greater than the average diameter of the tail chamber 1712 over the length of the tail chamber 1712; and the average diameter of the tail chamber 1712 over the length of the tail chamber 1712 can be greater than the average diameter of the air chamber shaft 1714 over the length of the air chamber shaft 1714. It should be understood that this example is illustrative, and therefore should not be construed as being limiting in any way.

In some embodiments, a user can squeeze the exterior of the weighted lure 100 near the body chamber 1710 to cause the body chamber 1710 to collapse and/or to squeeze air out of the body chamber 1710 and a) into the tail chamber 1712 and/or b) out of the air chamber 1700 and into the ambient environment (e.g., the water). Similarly, in some embodiments, a user can squeeze the exterior of the weighted lure 100 near the tail chamber 1712 to cause the tail chamber 1712 to collapse and/or to squeeze air out of the tail chamber 1712 and a) into the body chamber 1710 and/or b) out of the air chamber 1700 and into the ambient environment (e.g., the water). It should be understood that these examples are illustrative, and therefore should not be construed as being limiting in any way.

A cross-section view of the weighted lure 100 shown in FIG. 17 is illustrated in FIG. 18. In FIG. 18, the interior structures of the weighted lure 100 can more easily be seen. In particular, as shown in FIG. 18, the air chamber 1700 can extend from the tail end 1704 of the weighted lure 100 to the beginning of (or into) the weighted portion 1000. Thus, it can be appreciated that the air chamber 1700 of various embodiments of the concepts and technologies disclosed herein can include a continuation air cavern, chamber, or pocket that can extend through a majority of the length of the weighted lure 100, in some embodiments. It should be understood that this example is illustrative, and therefore should not be construed as being limiting in any way.

As used herein and in the claims, the phrase "air chamber" refers to the air chamber 1700 illustrated and described herein and to a continuous void that is deliberately formed in the weighted lure 100. The "air chamber" recited in the claims excludes individual air bubbles and/or multiple individual air bubbles, individual microbubbles and/or multiple microbubbles, cavitation in the material used to form the lure (e.g., plastisol), or the like, which may result from air being inadvertently and/or purposefully mixed into the plastisol as generally is understood in the art. According to some embodiments of the concepts and technologies disclosed herein, the "air chamber" recited in the claims refers to a continuous void formed in the weighted lure 100, where the air chamber extends through at least one tenth of the length/of the weighted lure 100. In some embodiments of the weighted lure 100, including the embodiment shown in FIG. 17, the air chamber 1700 can extend through at least half of the length/of the weighted lure 100, though the claims are not limited to such dimensions unless specifically recited as such in the claims.

More particularly, an "air chamber" as recited in the claims excludes (and does not refer to) randomly located and/or randomly resulting voids, air pockets, air bubbles, microbubbles, or the like. Rather, an "air chamber" as recited in the claims refers to a deliberately created continuous void, cavity, or other type of air chamber, where the air chamber is formed with a desired shape and in a desired location relative to the weighted lure 100. The location and shape of the air chamber recited in the claims can be configured by way of placing a structure (e.g., an air chamber pin as will be illustrated and described in more detail with reference to FIG. 19) having a desired shape and dimensions in a lure mold (e.g., the mold 2100 illustrated and described with reference to FIG. 21) before filling the mold with material, allowing the material to at least partially set in the mold, and then removing the structure from the at least partially set material as illustrated and described herein.

As noted above, according to various embodiments of the concepts and technologies disclosed herein, the air chamber 1700 can be sealed after removing the structure (e.g., an air chamber pin as will be illustrated and described in more detail with reference to FIG. 19). By sealing the air chamber 1700 (as opposed to leaving the air chamber 1700 open to the ambient environment), the air in the air chamber 1700 can be prevented from escaping the air chamber (e.g., passing from the air chamber 1700 into the ambient environment) due to water pressure. It should be understood that the tail end 1704 of the weighted lure 100 shown in FIG. 17 is illustrative, and that the tail end 1704 can have other shapes and/or configurations. In particular, as noted above, the worm shaped weighted lure 100 is illustrative of the concepts and technologies disclosed herein. Thus, it can be appreciated that the tail end 1704 of the weighted lure 100 can have a finesse tail, a ribbon tail, etc. Similarly, it should be understood that the weighted lure 100 can have a swim bait shape, a swim shad shape, a baitfish shape, and/or other shapes. As such, it should be understood that the illustrated embodiments are illustrative and should not be construed as being limiting in any way.

It should be understood that the shape of the weighted portion 1000 and the air chamber 1700 shown in FIGS. 17-18 is illustrative and should not be construed as being limiting in any way. In particular, the weighted portion 1000 and/or the air chamber 1700 can have various configurations, shapes, sizes, dimensions, relative sizes, and/or relative dimensions (relative to each other and/or relative to the body of the weighted lure 100). As such, the illustrated embodiment is illustrative and should not be construed as being limiting in any way.

The weighted portion 1000 illustrated and described herein with reference to FIGS. 17-18 can be formed, in some embodiments, by creating a high density plastisol in accordance with the various embodiments illustrated and described hereinabove. A high density plastisol can be made using a weighting material such as, for example, bismuth, tungsten, steel, iron, gold, other metals, other materials, combinations thereof, or the like. In some embodiments, the percentage of weighting substance by volume of the plastisol/weighting substance mixture used to provide the high density plastisol can be about ten percent. In some embodiments, the percentage of weighting substance by volume of the plastisol/weighting substance mixture used to provide the high density plastisol can exceed twenty percent. In some embodiments, the percentage of weighting substance by volume of the plastisol/weighting substance mixture used to provide the high density plastisol can exceed thirty percent.

In some embodiments, the percentage of weighting substance by volume of the plastisol/weighting substance mixture used to provide the high density plastisol can exceed forty percent. In some embodiments, the percentage of weighting substance by volume of the plastisol/weighting substance mixture used to provide the high density plastisol can exceed fifty percent. In some embodiments, the percentage of weighting substance by volume of the plastisol/weighting substance mixture used to provide the high density plastisol can exceed sixty percent. In some preferred embodiments, the percentage of weighting substance by volume of the plastisol/weighting substance mixture used to provide the high density plastisol can range from a minimum of about ten percent to a maximum of about sixty percent, though lower and higher percentages are contemplated as explained herein. It should be understood that these examples are illustrative, and therefore should not be construed as being limiting in any way.

The shape of the weighted portion 1000 is illustrative and should not be construed as being limiting in any way. After forming the weighted portion 1000, unweighted plastisol can be used to encase the weighted portion 1000. As used herein, the term "encase" can be used to refer to the weighted portion 1000 being surrounded on all sides by the unweighted plastisol (or other material used to form the body of the weighted lure 100) and/or by the air chamber 1700, as shown in FIGS. 17-18. Thus, the term "encasing" can refer to substantially surrounding the weighted portion 1000 with unweighted plastisol and/or air from the air chamber 1700, though some inadvertent air bubbles (e.g., cavitation) or other interruptions, intervening substances, and/or intervening structures/materials are possible and are contemplated.

In the illustrated embodiment shown in FIGS. 17-18, an encasement 1800 can be formed from the unweighted plastisol into the shape of a worm. It should be understood that this example is illustrative, and therefore should not be construed as being limiting in any way. Because the weighted portion 1000 can be formed from a plastisol/weighting substance mixture, the weighted portion 1000 can be completely joined to the unweighted plastisol, thereby forming a single weighted lure 100 that is durable and unlikely to fail (e.g., the weighted portion 1000 is unlikely to fall out of the weighted lure 100). As explained herein, the weighting of one end of the weighted lure 100 (by using the weighted portion 1000) can cause one end of the weighted lure 100 to sink, thereby mimicking worms and increasing the effectiveness of the weighted lure 100. Similarly, the buoyancy of the air chamber 1700 can cause the tail end 1704 to rise above the head end 1708 of the weighted lure 100, thereby even more closely mimicking worms and further increasing the effectiveness of the weighted lure 100. It should be understood that this example is illustrative, and therefore should not be construed as being limiting in any way.

Figure 19:
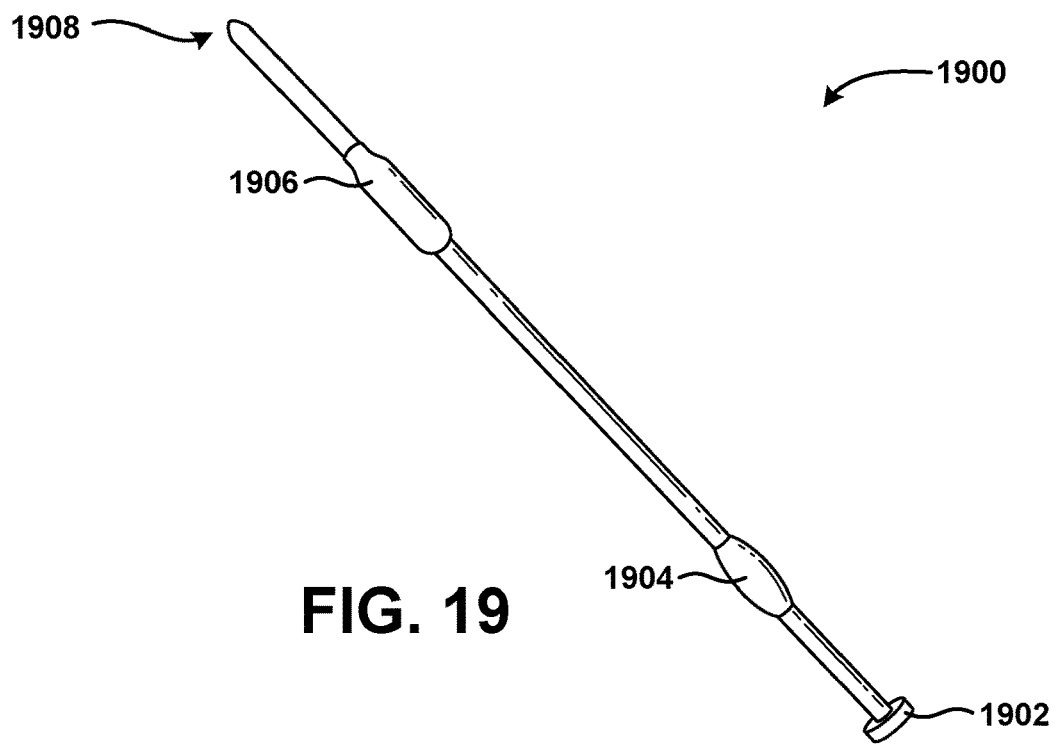
FIG. 19 is a line drawing showing an air chamber pin, according to one example embodiment of the concepts and technologies disclosed herein.
Figure 20:
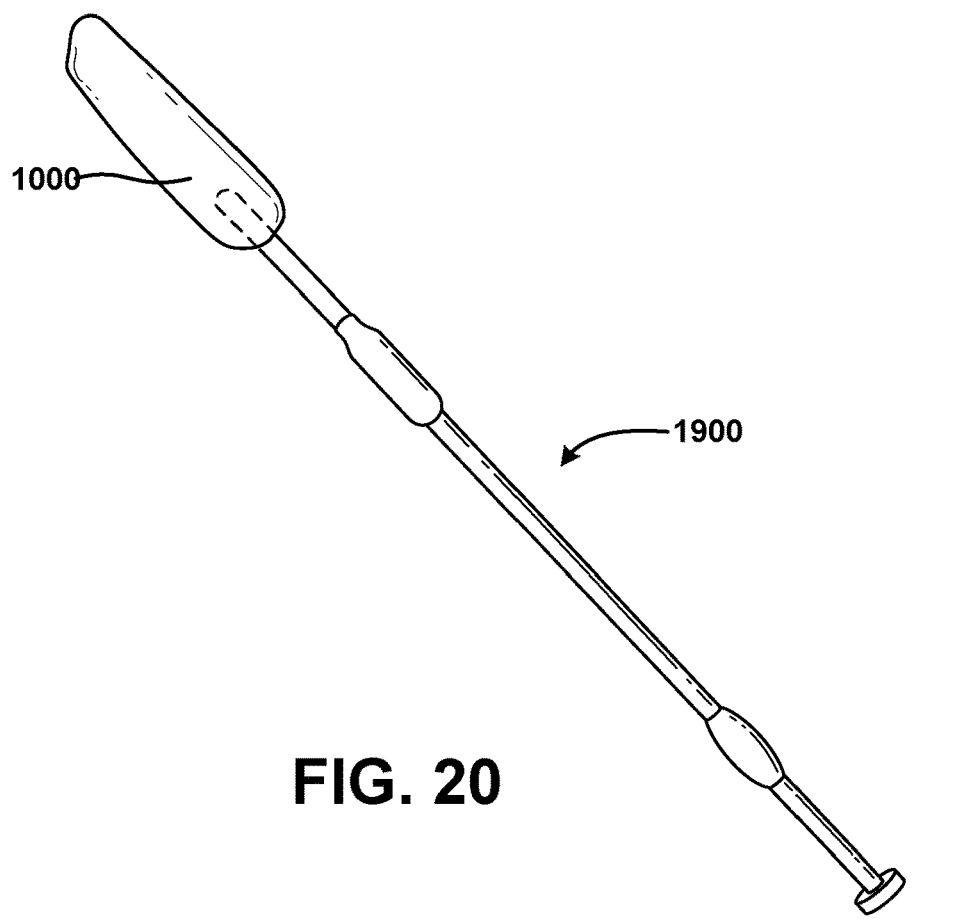
FIG. 20 is a line drawing showing a weighted portion attached to the air chamber pin, according to another example embodiment of the concepts and technologies disclosed herein.

Turning now to FIGS. 19-20, additional details of the weighted lure 100 will be illustrated and described in detail. In particular, FIG. 19 illustrates an air chamber pin 1900 that can be used to form the air chamber 1700 illustrated and described herein with reference to FIGS. 17-18. According to various embodiments, the air chamber pin 1900 can be formed from steel, copper, bronze, and/or other materials. The air chamber pin 1900 can be used to form the air chamber 1700 and/or to hold the weighted portion 1000 in position during the injection process by which the weighted lure 100 can be formed. It should be understood that this example is illustrative, and therefore should not be construed as being limiting in any way.

As shown in FIG. 19, the air chamber pin 1900 can include an air chamber pin retention structure 1902, which will be explained in more detail below with reference to FIG. 21. The air chamber pin 1900 can include a tail chamber formation structure 1904. The tail chamber formation structure 1904 can be formed with a desired shape, which can correspond to the desired shape of the tail chamber 1712 of the weighted lure 100. Similarly, the air chamber pin 1900 can include a body chamber formation structure 1906. The body chamber formation structure 1906 can be formed with a desired shape, which can correspond to the desired shape of the body chamber 1710 of the weighted lure 100. The air chamber pin 1900 also can include a weighted portion retention structure 1908. The weighted portion retention structure 1908 can be formed with a desired shape such as a point, or the like, for retaining the weighted portion thereon as will be explained in more detail herein. Thus, it should be understood that the illustrated shape is merely illustrative, and that the weighted portion retention structure 1908 can be formed as a pin or needle, in various embodiments. It should be understood that these examples are illustrative, and therefore should not be construed as being limiting in any way.

As shown in FIG. 20, a weighted portion 1000 can be placed onto the air chamber pin 1900 (e.g., the weighted portion 1000 can be pierced by the weighted portion retention structure 1908). The air chamber pin 1900 with the weighted portion 1000 retained thereon/thereby can then be located in a mold that can be used to form the weighted lure 100 before forming the weighted lure 100. Thus, the plastisol/weighting substance mixture (or unweighted plastisol) can encompass the air chamber pin 1900. Upon removal of the air chamber pin 1900 from the weighted lure 100, the air chamber 1700 can be formed. Thus, when the weighted lure 100 that includes the air chamber 1700 is put into water, the head of the weighted lure 100 can sink (due to the inclusion therein of the weighted portion 1000), and the tail of the weighted lure 100 can rise (due to the inclusion therein of the air chamber 1700 in the weighted lure 100). It should be understood that this example is illustrative, and therefore should not be construed as being limiting in any way.

Figure 21:
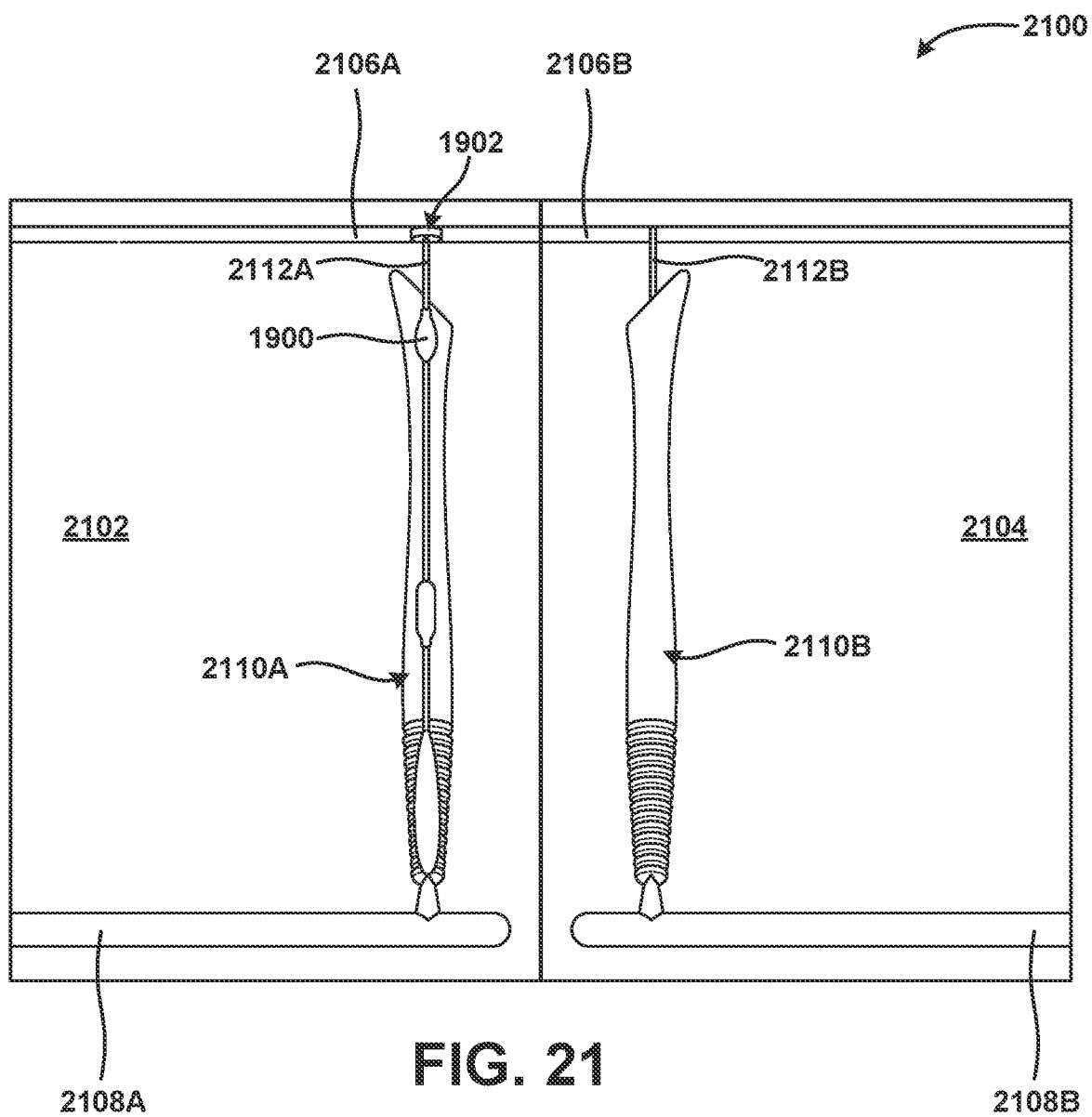
FIG. 21 is a line drawing showing a mold for forming a weighted lure, according to another example embodiment of the concepts and technologies disclosed herein.

Turning now to FIG. 21, an example mold 2100 for forming the weighted lure 100 illustrated and described in FIGS. 17-18 will be described in detail. In particular, FIG. 21 is a line drawing illustrating a top plan view of a mold 2100 for use in forming a weighted lure 100, according to an example embodiment. The mold 2100 includes a bottom portion 2102 and a top portion 2104. As is generally understood, the bottom portion 2102 and the top portion 2104 can be sandwiched together before injection. Furthermore, it should be understood that the mold 2100 can be used to form more than one weighted lure 100 at a time, and that the illustrated embodiment shows structure for forming only one weighted lure 100 for the sake of simplicity. Therefore, it should be understood that this example is illustrative, and therefore should not be construed as being limiting in any way.

The mold 2100 can include structures on the bottom portion 2102 and the top portion 2104 for forming a worm shape. As noted above, the worm shape is used for illustration, but other shapes are possible and are contemplated for the weighted lure 100. Thus, the claims are not directed to a worm-shaped lure unless the shape and/or portions of the shape (e.g., a head, tail, ridged portion, and clitellum) are recited in the claims. Furthermore, it should be understood that the illustrated shape is merely illustrative and should not be construed as being limiting in any way.

The mold 2100 also can include a retention structure slot 2106A. The retention structure slot 2106A is illustrated in FIG. 21 as being formed on the bottom portion 2102, but this embodiment is illustrative and should not be construed as being limiting in any way. It can be appreciated with reference to FIG. 21 that the top portion 2104 also can be formed with a retention structure slot 2106B. The retention structure slots 2106A-B (hereinafter collectively and/or generically referred to as "retention structure slot 2106") can be configured to accommodate the air chamber pin retention structure 1902 of the air chamber pin 1900, as shown in FIG. 21. In FIG. 21, the air chamber pin 1900 is illustrated as being placed into the mold 2100 with a weighted portion 1000 attached to the weighted portion retention structure 1908. It should be understood that this example is illustrative, and therefore should not be construed as being limiting in any way.

The mold 2100 also can include inlet structures 2108A-B (hereinafter collectively and/or generically referred to as "inlet structures 2108"). The inlet structures 2108 can be used to direct injected material (e.g., heated plastisol) into the mold 2100 and into worm shape voids 2110A-B (hereinafter collectively and/or generically referred to as "worm shape voids 2110") formed in the mold 2100. Thus, to form a worm-shaped lure (e.g., a weighted lure 100 as shown in FIG. 17), one or more materials (e.g., the plastisol/weighting substance mixtures illustrated and described herein) can be injected into the worm shape voids 2110 via the inlet structures 2108. It should be understood that this example is illustrative, and therefore should not be construed as being limiting in any way.

As can be appreciated with reference to FIG. 21, the configuration of the inlet structures 2108 relative to the placement and arrangement of the air chamber pin 1900 in the air chamber pin shafts 2112 can ensure that a weighted portion 1000 placed on the air chamber pin 1900 remains in its intended configuration and/or location during filling of the mold 2100 with material that is to be used to form the weighted lure 100 (other than the weighted portion 1000). Namely, the weighted portion 1000 can be attached to the air chamber pin 1900 such that the plastisol or other material being injected into the mold 2100 can enter the mold 2100 and push against the weighted portion 1000 where the force pushes the weighted portion 1000 further into the air chamber pin 1900 and not away from the air chamber pin 1900. This arrangement can ensure that the weighted portion 1000 is not pushed off the air chamber pin 1900 and/or significantly moved relative to its desired location/configuration as set by the location of the air chamber pin 1900. This can be important, as will be illustrated and described below with reference to FIG. 23, as the location and configuration of the weighted portion 1000 can be set by the air chamber pin 1900 to ensure that the weighted portion 1000 is encased by the non-weighted material used to form the weighted lure 100. Thus, filling the mold 2100 "head first" as illustrated in FIG. 21 can prevent substantial and/or significant movement of the weighted portion 1000 relative to the air chamber pin 1900. It should be understood that this example is illustrative, and therefore should not be construed as being limiting in any way.

The mold 2100 also can include air chamber pin shafts 2112A and 2112B (hereinafter collectively and/or generically referred to as the "air chamber pin shafts 2112"). In FIG. 21, the air chamber pin shaft 2112A is not visible due to the presence of the air chamber pin 1900 in the air chamber pin shaft 2112A. It should be understood that this example is illustrative and should not be construed as being limiting in any way.

The air chamber pin shafts 2112A and 2112B can be configured to accommodate the air chamber pin 1900, as shown in FIG. 21. In FIG. 21, the air chamber pin 1900 is illustrated as being placed into the mold 2100 with a weighted portion 1000 attached to the weighted portion retention structure 1908. It should be understood that this example is illustrative, and therefore should not be construed as being limiting in any way.

The weighted lures 100 shown in FIGS. 17-18 and methods of forming those weighted lures 100 (e.g., using the mold 2100 shown in FIG. 21) will now be described in more detail. The weighted portion 1000 can be formed, in some embodiments, by filling a weighted portion mold (not shown in FIG. 21, but illustrated and described in FIG. 13) with a high density plastisol as described herein. In one embodiment, the plastisol can be heated with tungsten powder, bismuth, or other weighting materials to form a high density plastisol/weighting substance mixture.

Figure 22:
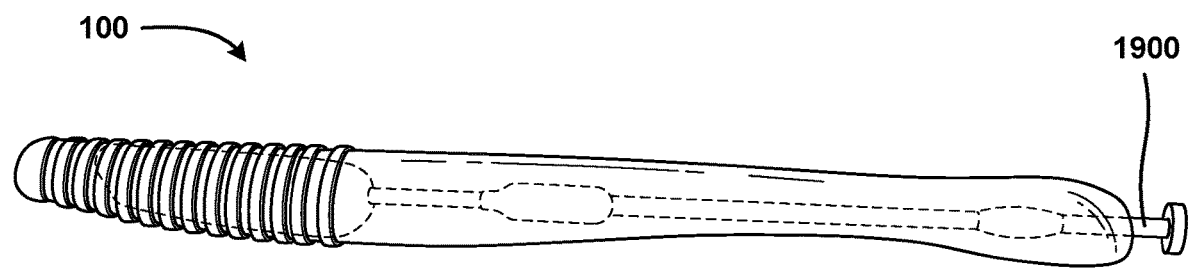
FIG. 22 is a line drawing showing a weighted lure, according to another example embodiment of the concepts and technologies disclosed herein.

The weighted portion 1000 can be allowed to cool and can be removed from its mold. The weighted portion 1000 can be placed onto the air chamber pin 1900 as shown in FIG. 20 to hold the weighted portion 1000 in place/orientation during injection. The mold 2100 can be closed and a plastisol/weighting substance mixture or unweighted plastisol (or other material) can be used to fill the worm shape voids 2110 of the mold 2100 via the inlet structures 2108 and allowed to cool. After cooling, a weighted lure 100 can be removed from the mold 2100. As shown in FIG. 22, the weighted lure 100 can still have the air chamber pin 1900 located within after cooling. Thus, the air chamber pin 1900 can be pulled out or otherwise removed from the weighted lure 100, thereby forming the air chamber 1700 illustrated and described herein. It should be understood that this example is illustrative, and therefore should not be construed as being limiting in any way.

Figure 23:
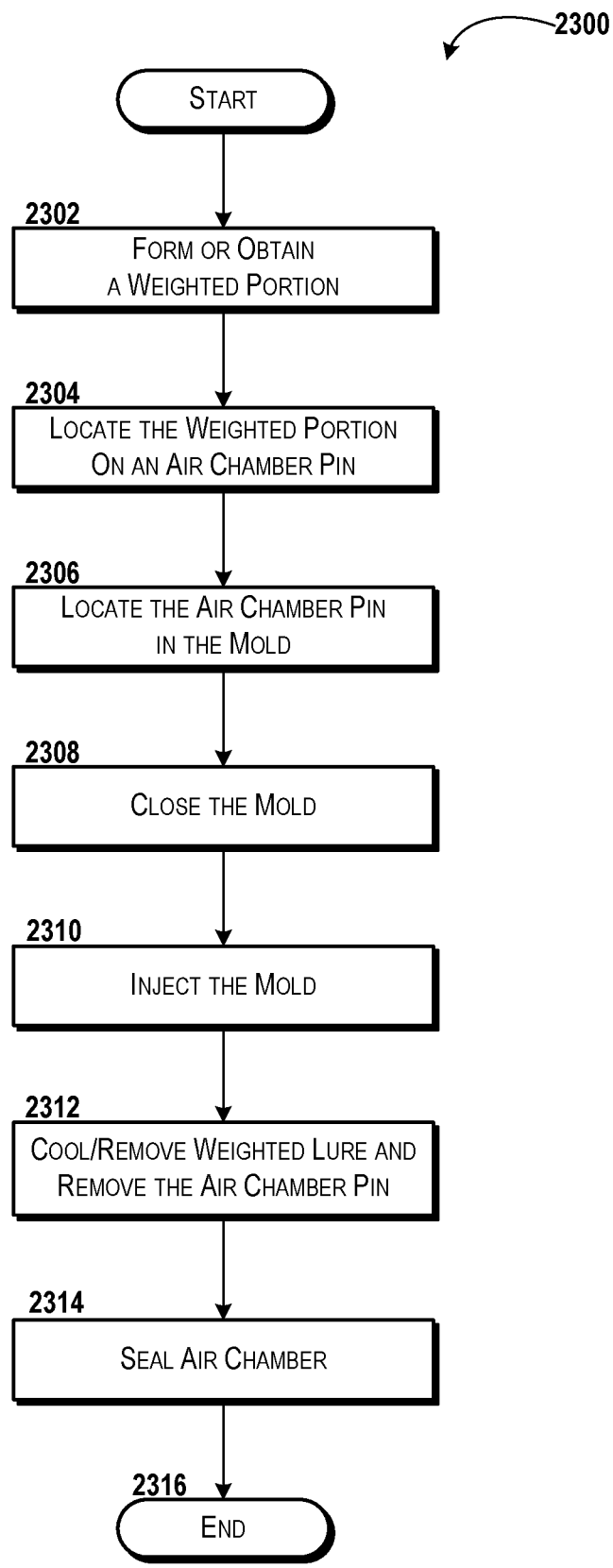
FIG. 23 schematically illustrates a method for forming a weighted lure, according to another example embodiment of the concepts and technologies disclosed herein.

Turning now to FIG. 23, aspects of a method 2300 for forming a weighted lure 100 will be described in detail, according to another illustrative embodiment. The method 2300 begins at operation 2302. At operation 2302, a weighted portion 1000 can be formed or obtained. As explained above, the weighted portion 1000 can be formed from a high density plastisol mixture such as a mixture of plastisol and a weighting material such as tungsten powder, bismuth, or other weighting materials as illustrated and described herein. In some embodiment, the high density plastisol mixture can have from about ten percent to about sixty percent weighting material (e.g., tungsten, bismuth, etc.) by volume.

In some embodiments, the high density plastisol can be heated. In some embodiments, the high density plastisol can be heated to about three hundred fifty degrees Fahrenheit. In some embodiments, the high density plastisol can be cooled before injection. In some embodiments, the high density plastisol can be cooled to about three hundred ten degrees Fahrenheit before injection. The high density plastisol mixture can be injected into a weighted portion mold 1308 (e.g., a portion of the mold 1300 and/or a standalone mold) to form the weighted portion 1000. After cooling, the weighted portion 1000 can be removed from the mold. It should be understood that this example is illustrative, and therefore should not be construed as being limiting in any way.

From operation 2302, the method 2300 can proceed to operation 2304. At operation 2304, the weighted portion 1000 obtained in operation 2302 can be located on an air chamber pin 1900. In some embodiments, the air chamber pin 1900 can have a point or other structure that can pierce or stab into the weighted portion 1000, and the weighted portion 1000 can thereby be stuck onto the air chamber pin 1900 to hold the weighted portion 1000 in a desired configuration. In particular, the weighted portion 1000 can be formed from a plastisol/weighting material mixture, the weighted portion 1000 can be pierced by the air chamber pin 1900 and held in place thereby. It should be understood that this example is illustrative, and therefore should not be construed as being limiting in any way.

From operation 2304, the method 2300 can proceed to operation 2306. At operation 2306, the air chamber pin 1900 with the weighted portion 1000 attached thereto can be located in the mold 2100, for example, by placing the air chamber pin retention structure 1902 in the retention structure slot 2106 and into the air chamber pin shafts 2112 as illustrated and described above with reference to FIG. 21. According to various embodiments of the concepts and technologies disclosed herein, the air chamber pin shafts 2112 and/or retention structure slots 2106 are precision formed to hold the air chamber pin 1900 in a precise location.

It can be appreciated that by precisely locating the air chamber pin 1900 relative to the mold 2100 (e.g., by way of using the air chamber pin shafts 2112 and/or retention structure slot 2106 to hold the air chamber pin 1900 firmly in a desired location and configuration), the location of the weighted portion 1000 (which as noted above can be attached to the air chamber pin 1900) can be precisely set relative to the mold 2100. This can help ensure that the weighted portion 1000 can be completely encased by the non-weighted material (e.g., plastisol), or at least encased on all sides other than at an area (e.g., an attachment point) at which the weighted portion 1000 is attached to the air chamber pin 1900, as illustrated and described herein. Thus, it can be appreciated that embodiments of the concepts and technologies disclosed herein can ensure that no part or portion of the weighted portion 1000 will correspond to an outside surface and/or be located at an outside surface of the weighted lure 100, which can keep the weighted lure 100 from breaking and/or failing and can ensure that the weighted portion 1000 is encased by the non-weighted plastisol as illustrated and described hereinabove. It should be understood that this example is illustrative, and therefore should not be construed as being limiting in any way.

From operation 2306, the method 2300 can proceed to operation 2308. At operation 2308, the mold (e.g., the mold 2100) can be closed/assembled together. The plastisol can be heated before this operation or at this time. As noted above, the plastisol or other material can be injected into the mold 2100 such that the injected material pushes into the weighted portion 1000 such that the weighted portion 1000 is not pushed away from and/or off of the air chamber pin 1900. In some embodiments, the air chamber pin 1900 can extend from a tail end of the mold 2100 (e.g., an end at which the tail of the weighted lure 100 will be formed) toward the head end of the mold 2100, and the mold 2100 can be injected from the head end of the mold 2100, thereby ensuring that the relative placement of the weighted portion 1000 relative to the mold 2100 will not be significantly and/or substantially altered through the filing of the mold 2100. This filling of the mold 2100 "head first" can also ensure that the weighted portion 1000 will not be moved, thereby helping to ensure that the weighted portion 1000 will be encased by unweighted material as illustrated and described herein. It should be understood that this example is illustrative, and therefore should not be construed as being limiting in any way.

In some embodiments, an unweighted plastisol can be used to fill the mold 2100, while in some other embodiments, a plastisol/weighting substance mixture can be used. In some embodiments, the plastisol can be heated to about three hundred fifty degrees Fahrenheit. In some embodiments, the plastisol can be cooled to about three hundred ten degrees Fahrenheit before injection. It should be understood that this example is illustrative, and therefore should not be construed as being limiting in any way.

From operation 2308, the method 2300 can proceed to operation 2310. At operation 2310, the mold 2100 can be injected with the plastisol to form the weighted lure 100. According to various embodiments of the concepts and technologies disclosed herein, the plastisol can be injected into the mold 2100 via the inlet structures 2108. The plastisol injected into the mold 2100 can engulf/surround the weighted portion 1000 and the air chamber pin 1900. It should be understood that this example is illustrative, and therefore should not be construed as being limiting in any way.

From operation 2310, the method 2300 can proceed to operation 2312. At operation 2312, the weighted lure 100 can be cooled and/or removed from the mold 2100. The air chamber pin 1900 can also be removed from the weighted lure 100 (if desired), thereby forming an air chamber such as the air chamber 1700 illustrated in FIGS. 17-18. It can be appreciated that because the plastisol can be elastic and/or stretchable in some embodiments, that the air chamber pin 1900 can be removed from the weighted lure 100 without breaking the weighted lure 100. It should be understood that this example is illustrative, and therefore should not be construed as being limiting in any way.

From operation 2312, the method 2300 can proceed to operation 2314. At operation 2314, the air chamber 1700 can be sealed, if desired. In various embodiments, the air chamber 1700 can be sealed by heat, can be sealed by glue, injected with silicone, injected with plastisol, fused, sealed using a positive pressure roll sear, or otherwise can be sealed to create a seal 1204 that can enclose the air chamber 1700 and/or prevent leakage of air in the air chamber 1700 to the outside of the weighted lure 100. In some other embodiments, the air chamber 1700 may not be sealed, thereby enabling a user or other entity to squeeze air out of the air chamber 1700 to modify the buoyancy of the weighted lure 100 as illustrated and described hereinabove. It should be understood that this example is illustrative, and therefore should not be construed as being limiting in any way.

From operation 2314, the method 2300 can proceed to operation 2316. The method 2300 can end at operation 2316.

Figure 24:
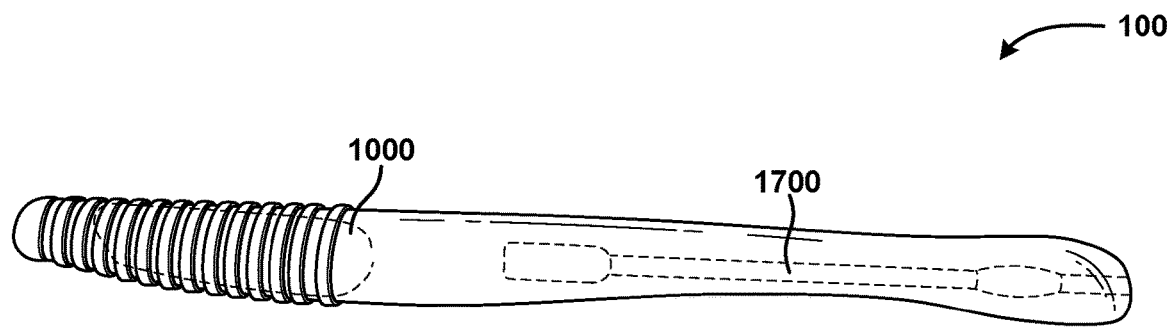
FIG. 24 is a line drawing showing a weighted lure, according to another example embodiment of the concepts and technologies disclosed herein.
Figure 25:
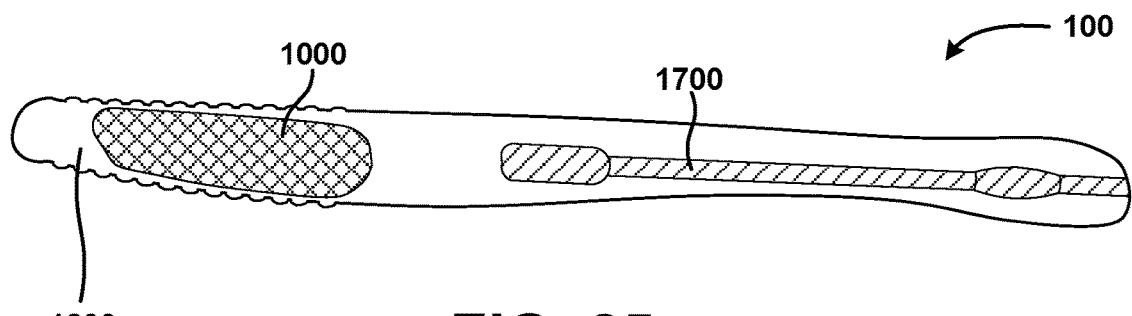
FIG. 25 is a line drawing showing a cross-sectional view of a weighted lure, according to another example embodiment of the concepts and technologies disclosed herein.

It should be understood that some aspects of the multiple embodiments illustrated and described herein can be combined with one another. For example, the mold 2100 can be used in association with pins that can be similar to the pins 1400 shown in FIG. 14 to hold the weighted portion 1000, and the air chamber pin 1900 can be shorter than the embodiment shown in FIG. 19. An example of a weighted lure 100 formed in such a manner is shown in FIG. 24, and a cross-sectional view is shown in FIG. 25. The illustrated embodiment is illustrative and should not be construed as being limiting in any way. Similarly, because other combinations of various aspects of the embodiments illustrated and described can be made, it should be understood that the embodiments illustrated and described herein are illustrative and should not be construed as being limiting in any way.

Based on the foregoing, it should be appreciated that weighted lures and methods for making weighted lures have been disclosed herein. Although the subject matter presented herein has been described with respect to various structural features and/or methodological and transformative acts for forming the lures and/or the various features thereof, it is to be understood that the concepts and technologies disclosed herein are not necessarily limited to the specific features or acts described herein. Rather, the specific features and acts are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A weighted lure comprising:
    a weighted portion formed from a weighted plastisol comprising plastisol and a weighting substance dispersed within the plastisol;
    a body formed from an unweighted plastisol, wherein the body has a length that extends from a tail end of the body to a head end of the body, and wherein the body encases the weighted portion, and wherein the weighted portion is located at the head end of the body; and
    an air chamber formed within the body, wherein the air chamber extends along the length from the tail end of the body to the head end of the body, wherein the air chamber comprises a body chamber, an air chamber shaft, and a tail chamber, and wherein the air chamber extends along at least a half of a total length of the body.

2. The weighted lure of claim 1, wherein the air chamber is sealed at the tail end of the body to prevent air in the air chamber from escaping the air chamber.

3. The weighted lure of claim 1, wherein the body chamber has a first diameter, and wherein the tail chamber has a second diameter.

4. The weighted lure of claim 3, wherein the air chamber shaft has a third diameter.

5. The weighted lure of claim 1, wherein the weighting substance comprises bismuth.

6. The weighted lure of claim 1, wherein the weighting substance comprises tungsten.

7. The weighted lure of claim 1, wherein the body comprises a ridged portion near the head end of the body and a smooth portion near the tail end of the body.

8. The weighted lure of claim 1, wherein the air chamber begins at the tail end of the body and extends from the tail end of the body to the weighted portion.

9. A weighted lure comprising:
    a body formed from a first material comprising plastisol, wherein the body has a length that extends from a tail end of the body to a head end of the body;
    a weighted portion formed from a second material comprising plastisol and a weighting substance dispersed within the plastisol, wherein the weighted portion is encased by the body, and wherein the weighted portion is located at the head end; and
    an air chamber formed within the body, wherein the air chamber is located at the tail end, and wherein the air chamber extends from the tail end toward the head end along the length wherein the air chamber comprises a body chamber, an air chamber shaft, and a tail chamber.

10. The weighted lure of claim 9, wherein the air chamber begins at the tail end of the body and extends from the tail end of the body to the weighted portion.

11. The weighted lure of claim 10, wherein the weighted portion is located at the head end of the body.

12. The weighted lure of claim 9, wherein the body comprises a ridged portion near the head end of the body and a smooth portion near the tail end of the body.

13. The weighted lure of claim 9, wherein the weighting substance comprises bismuth.

14. The weighted lure of claim 9, wherein the weighting substance comprises tungsten.

15. The weighted lure of claim 9, wherein the air chamber is sealed at the tail end of the body to prevent air in the air chamber from escaping the air chamber.

16. The weighted lure of claim 9, wherein the body chamber has a first diameter, and wherein the tail chamber has a second diameter.

17. The weighted lure of claim 16, wherein the air chamber shaft has a third diameter.

18. A weighted lure comprising:
- a body formed from a first material comprising plastisol, wherein the body comprises a head end, a body portion, and a tail end, and wherein the body has a length that extends from the tail end to the head end;
- a weighted portion formed from a second material comprising plastisol and a weighting substance dispersed within the plastisol, wherein the weighted portion is encased by the body, and wherein the weighted portion is located at the head end; and
- an air chamber formed within the body, wherein the air chamber is located at least partially at the tail end, and wherein the air chamber extends from the tail end toward the head end along the length, and wherein the air chamber comprises:
  - a tail chamber that is located at least partially at the tail end,
  - a body chamber that is located in the body portion, and
  - a shaft that joins the tail chamber to the body chamber.

19. The weighted lure of claim 18, wherein the body chamber has a first diameter, wherein the tail chamber has a second diameter, and wherein the shaft has a third diameter.

20. The weighted lure of claim 18, wherein the weighting substance comprises bismuth.

* * * * *